Oct. 16, 1962 F. P. GOHOREL 3,059,055

TELEPHONE SYSTEMS

Filed May 5, 1958 15 Sheets-Sheet 1

Inventor
F. P. Gohorel

By Robert Harding Jr.
Attorney

Inventor
F. P. Gohorel
By Robert Harding Jr.
Attorney

Inventor
F. P. Gohorel
By Robert Harding Jr.
Attorney

Inventor
F. P. Gohorel
By Robert Harding Jr.
Attorney

Oct. 16, 1962 F. P. GOHOREL 3,059,055

TELEPHONE SYSTEMS

Filed May 5, 1958 15 Sheets-Sheet 5

Inventor
F. P. Gohorel
By Robert Harding Jr.
Attorney

Oct. 16, 1962 F. P. GOHOREL 3,059,055

TELEPHONE SYSTEMS

Filed May 5, 1958 15 Sheets-Sheet 6

Inventor
F. P. Gohorel
By Robert Harding Jr.
Attorney

Oct. 16, 1962 F. P. GOHOREL 3,059,055

TELEPHONE SYSTEMS

Filed May 5, 1958 15 Sheets-Sheet 7

Inventor
F. P. Gohorel
By Robert Harding Jr.
Attorney

Oct. 16, 1962 F. P. GOHOREL 3,059,055

TELEPHONE SYSTEMS

Filed May 5, 1958 15 Sheets-Sheet 8

*Inventor*

F. P. Gohorel

By Robert Harding Jr.

*Attorney*

Inventor
F. P. Gohorel
By Robert Harding Jr.
Attorney

Inventor
F. P. Gohorel
By Robert Harding Jr.
Attorney

Oct. 16, 1962 F. P. GOHOREL 3,059,055

TELEPHONE SYSTEMS

Filed May 5, 1958 15 Sheets-Sheet 11

Inventor
F. P. Gohorel.
By Robert Harding Jr.
Attorney

Oct. 16, 1962 F. P. GOHOREL 3,059,055

TELEPHONE SYSTEMS

Filed May 5, 1958 15 Sheets-Sheet 12

Inventor
F. P. Gohorel

By Robert Harding Jr.
Attorney

Oct. 16, 1962 F. P. GOHOREL 3,059,055

TELEPHONE SYSTEMS

Filed May 5, 1958 15 Sheets-Sheet 13

Inventor
F. P. Gohorel
By [signature]
Attorney

Oct. 16, 1962 F. P. GOHOREL 3,059,055

TELEPHONE SYSTEMS

Filed May 5, 1958 15 Sheets-Sheet 14

Inventor
F. P. Gohorel
By [signature]
Attorney

Oct. 16, 1962 F. P. GOHOREL 3,059,055

TELEPHONE SYSTEMS

Filed May 5, 1958 15 Sheets-Sheet 15

Inventor
F. P. Gohorel
By Robert Harding Jr.
Attorney

United States Patent Office 3,059,055
Patented Oct. 16, 1962

3,059,055
TELEPHONE SYSTEMS
Fernand Pierre Gohorel, Antony, France, assignor to International Standard Electric Corporation, New York, N.Y., a corporation of Delaware
Filed May 5, 1958, Ser. No. 732,912
7 Claims. (Cl. 179—7)

The present invention refers to improvements in telephone systems and more particularly in the signaling and supply bridges used in automatic exchanges.

Each line or circuit connected to an automatic exchange is, in general, associated with a signaling bridge or equipment designed to send and receive the various signals required for the routing of the call. Now, these lines or circuits may be of very different types. Some are operated on direct current, while others are operated on alternating current of commercial, voice or higher frequencies. The codes used for signaling may themselves vary from one circuit to another. There are also simplified-signaling lines or circuits, wherein the signals are sent by supplying direct current of a predetermined direction and are received through breaks in the loop or variations of its resistance. Such is the case, for example, of the more-common types of lines: subscriber lines, trunks between local exchanges, etc. In the case of subscriber lines, generally only one supply bridge is provided, common to all or part of said lines and split by one or more selection stages. Of course, it must be possible to exchange signals and controls between the equipment at the calling and the called end. Obviously, special equipment can be provided for each type of circuit or line, but this procedure complicates design and entails an increase in cost. The use of a single bridge the two sides of which could be modified in accordance with the type of line with which they are associated is often impossible owing to the large number of different cases encountered. The invention proposes to provide a solution for this problem.

The invention also proposes to reduce the number of signaling and supply bridges connected in series, so as to prevent undue attenuation of the connection. It provides a bridge for the calling end and a bridge for the called end, all other bridges being eliminated.

One of the features of the invention is an automatic telephone system using a selection chain to connect two lines or circuits and wherein with each line or circuit, or with each line or circuit group, both at the calling and at the called end, is associated a signaling bridge or equipment consisting of a combination of two means, the one adapted to the line or circuit and designed to send out and receive the signals required for the routing of a call and the other a standard means that allows exchanging signals and controls within the exchange and, possibly, recording certain information required for putting through a call and determining the tolls thereon, the design of these standard means making it possible to simplify manufacture and reduce the cost.

Another feature of the invention is that, when the line or circuit at either end of the selection chain requires only simplified signaling, certain changes are made in the standard means of the equipment located at the other end of the selection chain that allow it to adapt itself to the characteristics or the operating method of the simplified-signaling circuit, thus making it possible to use a single bridge for the selection chain, with the consequent saving in material and reduction of the attenuation.

The arrangements covered by the preceding feature find application particularly in the case of subscriber lines or of certain lines leading to exchanges and that must always be supplied.

Another feature of the invention is that the signaling and supply bridges comprising modifiable means are always placed, with respect to the selection chain, on the called-end line or circuit.

Another features of the invention is that the standard means receives from the register all the signals that will allow it either to operate in conjunction with the calling-end signaling bridge or to adapt itself to simplified-signaling lines or circuits.

Another features of the invention is that line wires are used to make the changes required in the standard means of the signaling and supply bridges and that the register controls these changes on the basis of signals received at the time of the selections both from the calling and the called lines.

Therefore, through certain modifications, the called-end signaling and supply bridge can perform two different functions: it can operate in conjunction with the calling-end signaling bridge and thus allow the exchange of signals and controls within the central office or else adapt itself directly to a simplified-signaling circuit. In accordance with a variant, a slightly-different arrangement yielding the same result can be adopted.

Another feature of the invention is to allot the bridges associated with certain lines or with certain circuits at the called end, some operating in conjunction with a calling-end signaling bridge and allowing the exchange of signals and controls within the central office and the others supplying the calling line directly, arrangements being provided to direct the selectors to an allotted bridge depending upon the nature of the calling equipment.

Other functions can be assigned to the signaling and supply bridges as secondary functions.

Another feature of the invention is that signals can be sent from the registers to the signaling and supply bridges for special and nonrecurrent functions such as for determination of the tolls or for recording calls, supplementary signals received from said bridges allowing the registers to do such sending.

Another feature of the invention is that, to take care of exceptional cases, the signaling and supply bridge can be eliminated by a metallic connection that allows using some other bridge or termination meeting the requirements of such exceptional cases.

Various other features will become apparent from the description that follows, given as a nonlimitative example with reference to the accompanying drawing, wherein.

Figure 9:
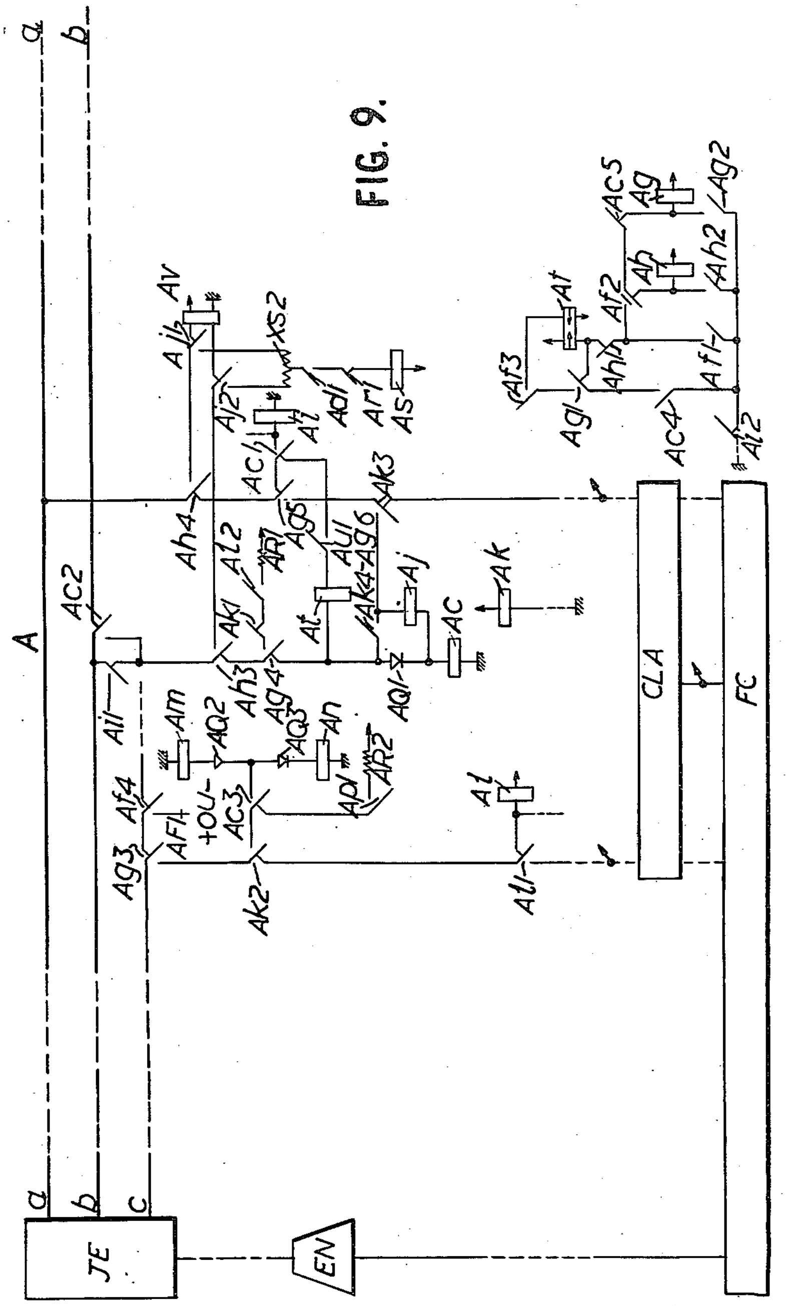
FIG. 9 is a block diagram of a signaling and supply bridge in accordance with the invention.
Figure 13A:
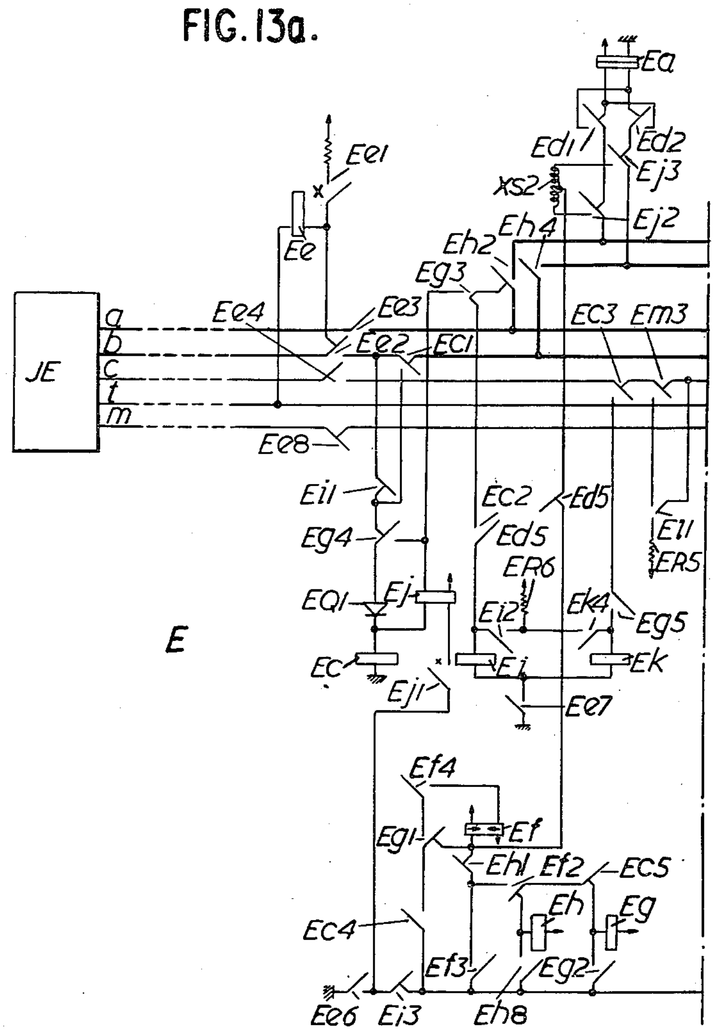
Figure 13B:
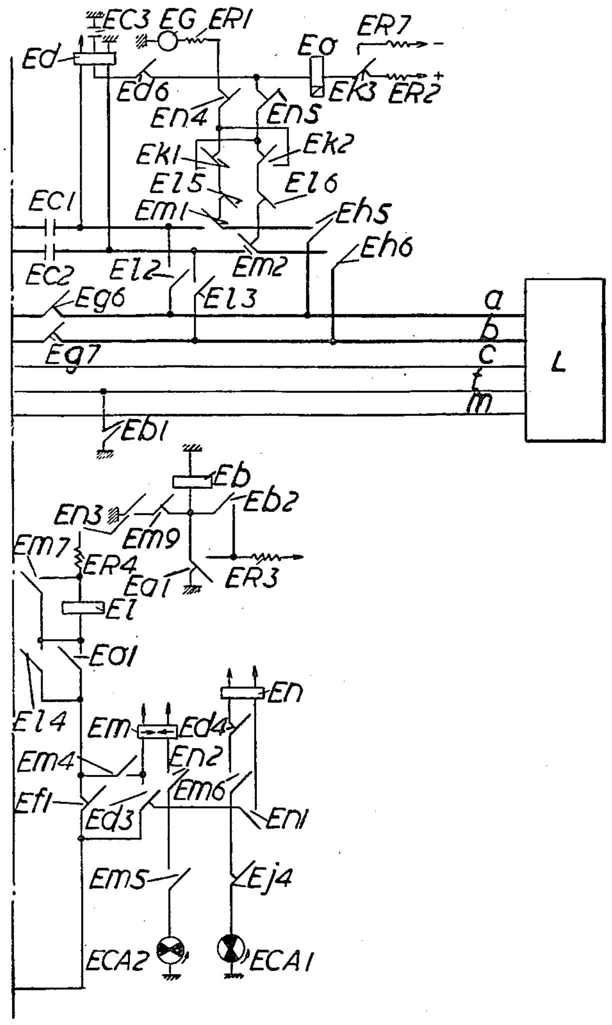

FIGS. 13 and 13*b* show the application of the FIG. 9 diagram to the case of a local battery feeder circuit offering the possibility of establishing a metallic connection and of having access to party lines.

Figure 14A:
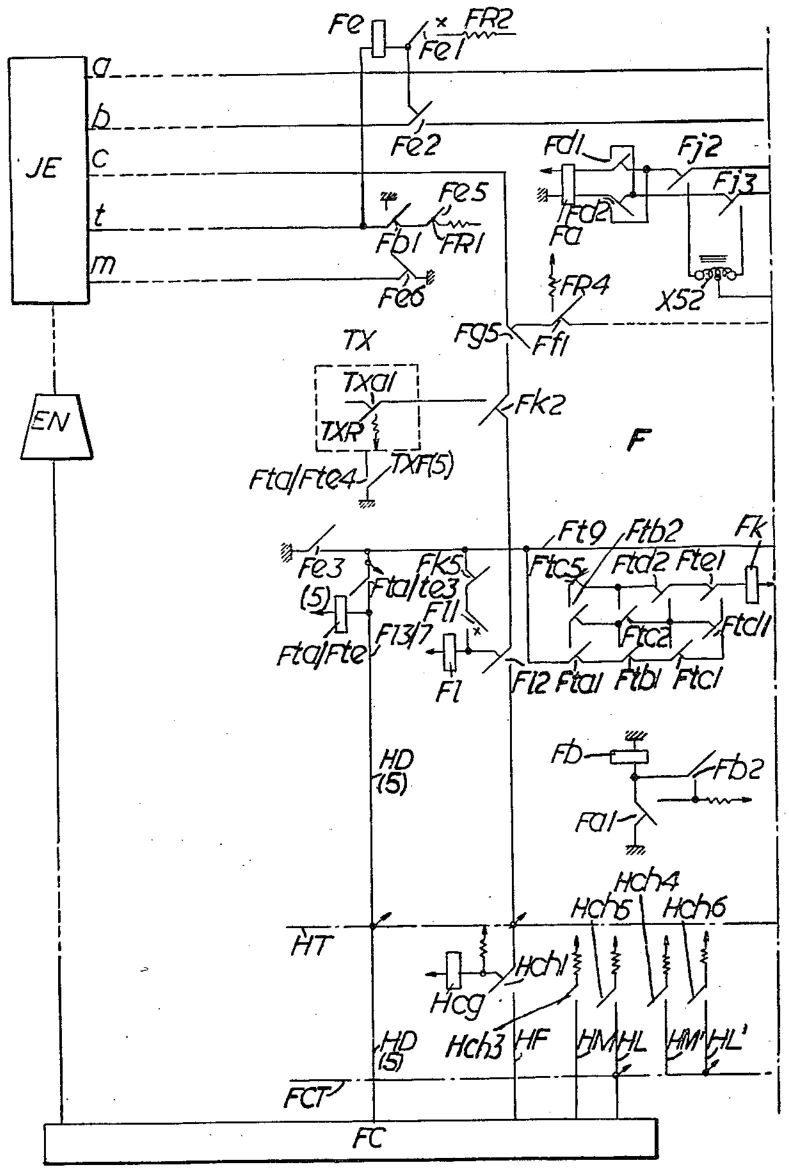
Figure 14B:
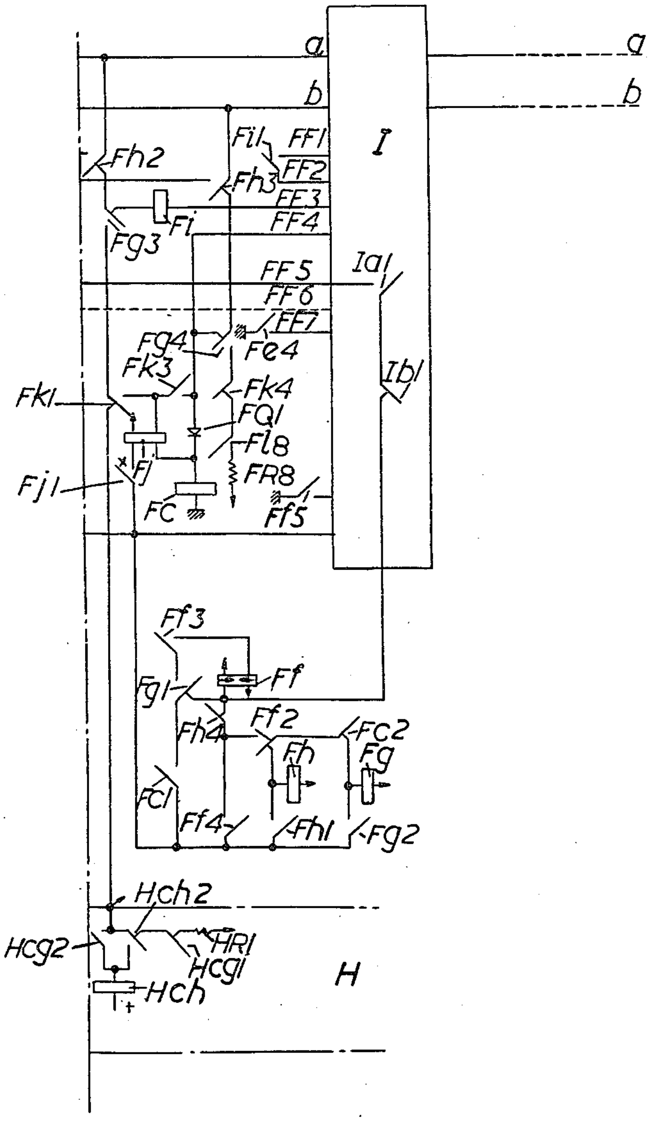

FIGS. 14*a* and 14*b* show the application of the FIG. 9 diagram to the case of a multiple charge originating line adaptor.

A wiring diagram showing the normal position of the signaling and supply bridges in an automatic telephone exchange in accordance with the invention will now be described with reference to FIG. 1. To establish a connection between a calling subscriber AB and a called subscriber AB′, a line selector L is provided to hunt for calling subscriber AB and connect him to a register connector JE. The latter is thereupon connected to a register EN the function of which is to receive the digits dialed by the calling subscriber and send the selective combinations required for the routing of the various selection stages. Two selectors have been provided, one a group selector G, which selects a free line in the group corresponding to the number dialed, and the other line selector L′, which selects called subscriber AB′ within his own group. To supply both subscribers, a circuit AL1, consisting of two sections *s* and *n/s*, is provided between group selector G and line selector L′. Section *s* is a fixed supply bridge designed to supply called subscriber AB′. Section *n/s* is a modifiable bridge that can perform signaling or supply functions as required. In the example described, the calling subscriber is one that must be supplied. For this purpose, register EN sends feeder circuit AL1 a special signal that brings about in section *n/s* all the changes required to have that section supply calling subscriber AB. The holding of the talking connection is thereupon provided by feeder circuit AL1. At the end of the call, the replacement of the handset by the calling and called subscribers is detected by section *n/s* and section *s*, respectively, feeder circuit AL1 then causing the release of the various devices seized. In accordance with a known method, this release can occur when the calling or the called subscriber hangs up, when the first of them does so or, finally, when both have replaced their handset.

To route calls coming from a distant exchange located ahead of the particular exchange involved, each terminating circuit CA is associated with a line adaptor JN1 consisting of two sections *a* and *n*. The role of section *a* is to receive and send all the signals required for the routing of the call. Generally it receives a seizure signal coming from the distant exchange and sends said exchange an invitation-to-send signal when register EN is ready to receive the dialing pulses. It then sends said dialing pulses to register EN, which in turn sends the selective combinations required to route group selector G and line selector L′ to called subscriber AB′. When the selection of said subscriber has ended, section *a* of line adapter JN1 sends to the exchange ahead signals characterizing the availability of the called subscriber, his answer and finally his replacement of the handset; it also sends a signal showing said subscriber to be busy if such is required. Circuit CA can operate in accordance with very different methods. Thus, for example, the sending of the signals required for the routing of a call can be done on D.C., on commercial-frequency A.C., on VF A.C., or any other way. The number and the type of signals exchanged can also vary within broad limits. Thus, for example, some circuits send end-of-dialing signals, while others do not. From the foregoing explanations it follows that the make-up of section *a* of adapter JN1 depends essentially upon the type of circuit CA.

Section *n* of adapter JN1 is designed to receive from battery feeder AL1 the various signals required for the routing of the call (subscriber free, subscriber busy, answer required, hanging-up required, etc.). This is a standard section that does not depend upon the type of circuit CA and that can be adapted on a definite basis. Register EN sends feeder AL1 another special signal, which brings about in section *n/s* all changes required to adapt section *n/s* for operation with section *n* of adapter JN1. More precisely, section *n/s*, which in the case of a local call supplies calling subscriber AB, in the case here under consideration detects the various phases of the routing of the call (subscriber free, subscriber busy, answer required, hanging up required) and sends the corresponding signals to section *n* of adapter JN1. Direct current is generally used for this sending, which is effected within the same exchange.

To route a call from a local subscriber AB to an originating circuit CD, said circuit is associated with a line adapter JN2 directly connected to the banks of group selector G and consisting of two sections *n/s* and *a*. The role of section *a* is to send to circuit CD and receive from said circuit the various signals required for the routing of the call (seizure, invitation to send, etc.). Its make-up depends essentially upon the type of circuit CD. Section *n/s* is a modifiable section that can, as required, perform supply or signaling functions. In the example described, the calling subscriber is one that must be supplied. For this purpose, register EN sends adapter JN2 a signal that brings about in section *n/s* all the changes required for said section to supply calling subscriber AB.

Finally, the exchange under consideration can also handle transit calls received over terminating circuit CA and routed over originating circuit CD. In this case, register EN sends adapter JN2 a signal that brings about in section *n/s* all the changes required to adapt this section to section *n* of adapter JN1. More precisely, section *n/s*, which for an outgoing call supplies calling subscriber AB, in the case here under consideration detects the various phases of the routing of the call by means of signals sent it by section *a* and sends the corresponding signals to section *n* of adapter JN1.

Terminating and originating circuits SA and SD are similar to circuits CA and CD but terminate at small-capacity exchanges. They are connected on the banks of line selectors L′ like local subscribers AB and AB′ and are respectively associated with line adapters JN3 and JN4. Adapter JN3 consists of two sections *a* and *n* similar to those of adapter JN1. Adapter JN4 consists of two sections *n/s* and *a* similar to those of adapter JN2. The method of establishing connections through circuits SA and SD is similar to the one already described for circuits CA and CD. However, since adapter JN4 is connected to the banks of line selector L′ instead of to the banks of group selector G, special arrangements must be provided to prevent both signaling and supply bridge AL1 and adapter JN4 from being connected in series to the same talking connection, so as to prevent undue attenuation of the connection. To this end, the register sends feeder AL1 a special signal that causes the establishment of a metallic connection LM between the input and the output of said feeder.

Figure 2:
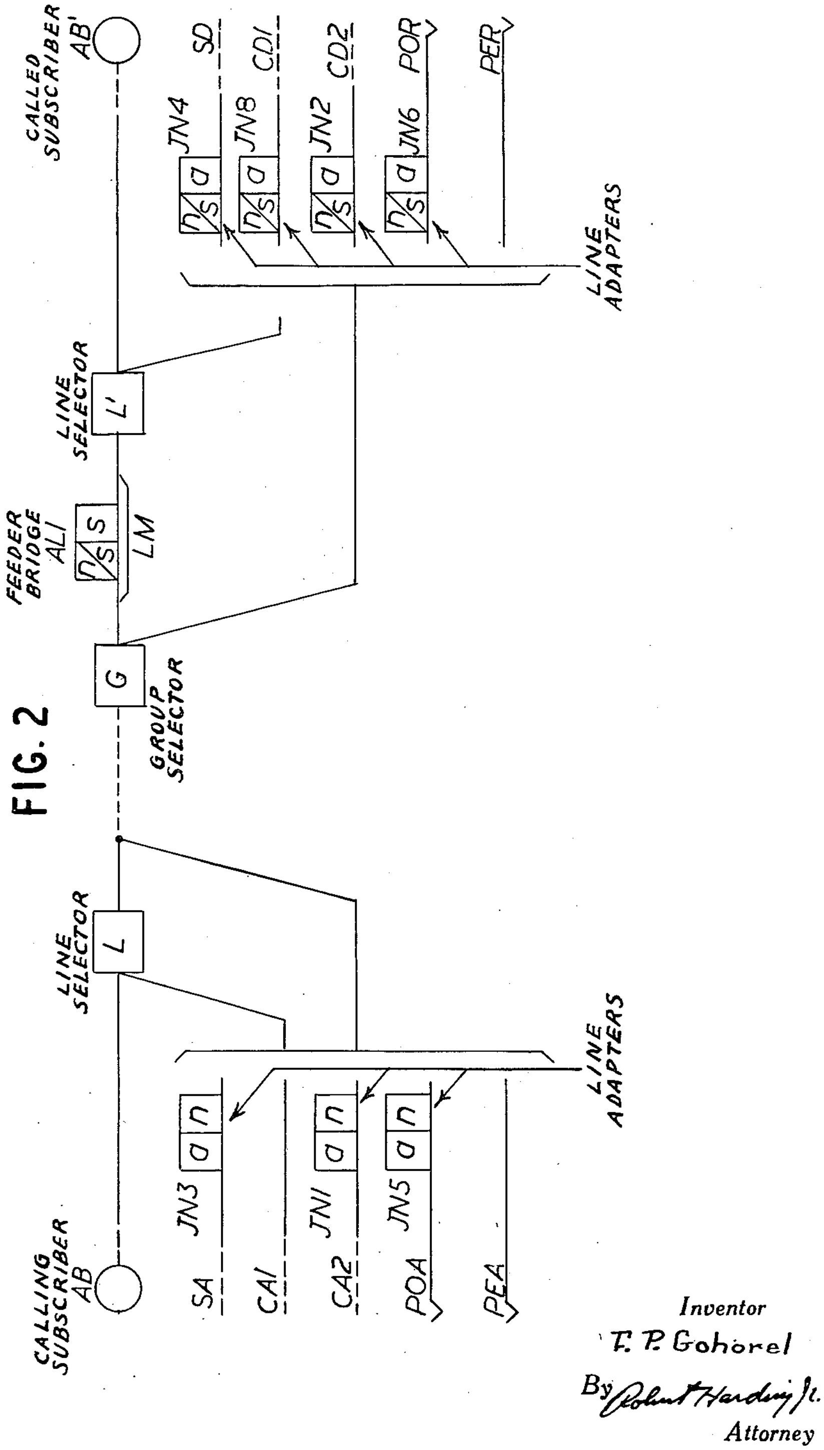
FIG. 2 is a variant of the diagram of FIG. 1 explicitly showing the signaling and supply bridges most commonly found in an exchange having one group-selecting stage.

FIG. 2 explicitly shows the various terminating and originating circuits terminating at the exchange under consideration and it also shows the position as well as the nature of the bridges most commonly found in an exchange having one group-selecting stage. At the calling end are local subscribers AB, circuits SA coming from satellites as well as the corresponding adapter JN3, circuits CA1 coming from local exchanges, automatic circuits CA2 as well as the corresponding adapter JN1, toll operator positions POA as well as the corresponding adapter JN5, and test positions PEA. These various circuits, along with the operator positions, are connected, as required, either to the banks of line selectors L or to the inlets of group selectors G. At the called end are local subbscribers AB′, circuits SD terminating at satellites as well as the corresponding adapter JN4, circuits CD1 to local exchanges as well as the corresponding adapter JN8, automatic circuits CD2 as well as the corresponding adapter JN2, toll operator positions POR as well as the corresponding adapter JN6, and test positions PER. These various circuits, along with the operator positions, are connected, as required, either to the banks of line selectors L′ or to the banks of group selectors G. Finally, feeders AL1 are provided between selectors G and L′, with the possibility of establishing metallic connections LM.

As examination of the figure will show, circuits CA1 coming from local exchanges are not associated with adapters. In fact, for a call coming from such an exchange, only one supply bridge is provided and, depending upon the case, it can be AL1, JN4, JN8, JN2 or JN6. The register, which, for the sake of simplifying the drawing, is not shown either in FIG. 2 or the rest, sends these bridges the special signal that brings about in section $n/s$ all the changes required to supply the local exchange located ahead. The various signals required for the routing of the call (subscriber free, subscriber busy, etc.) are therefore sent either by supplying the line wires or by reversing or suppressing the supply. By thus providing arrangements so that a local exchange ahead of the exchange involved will always be supplied, regardless of the condition of the called subscriber, there is a saving of one adapter at the calling end.

Of course, no adapter is to be associated with test positions PEA and PER, these positions being generally intended to establish metallic connections.

Figure 3:
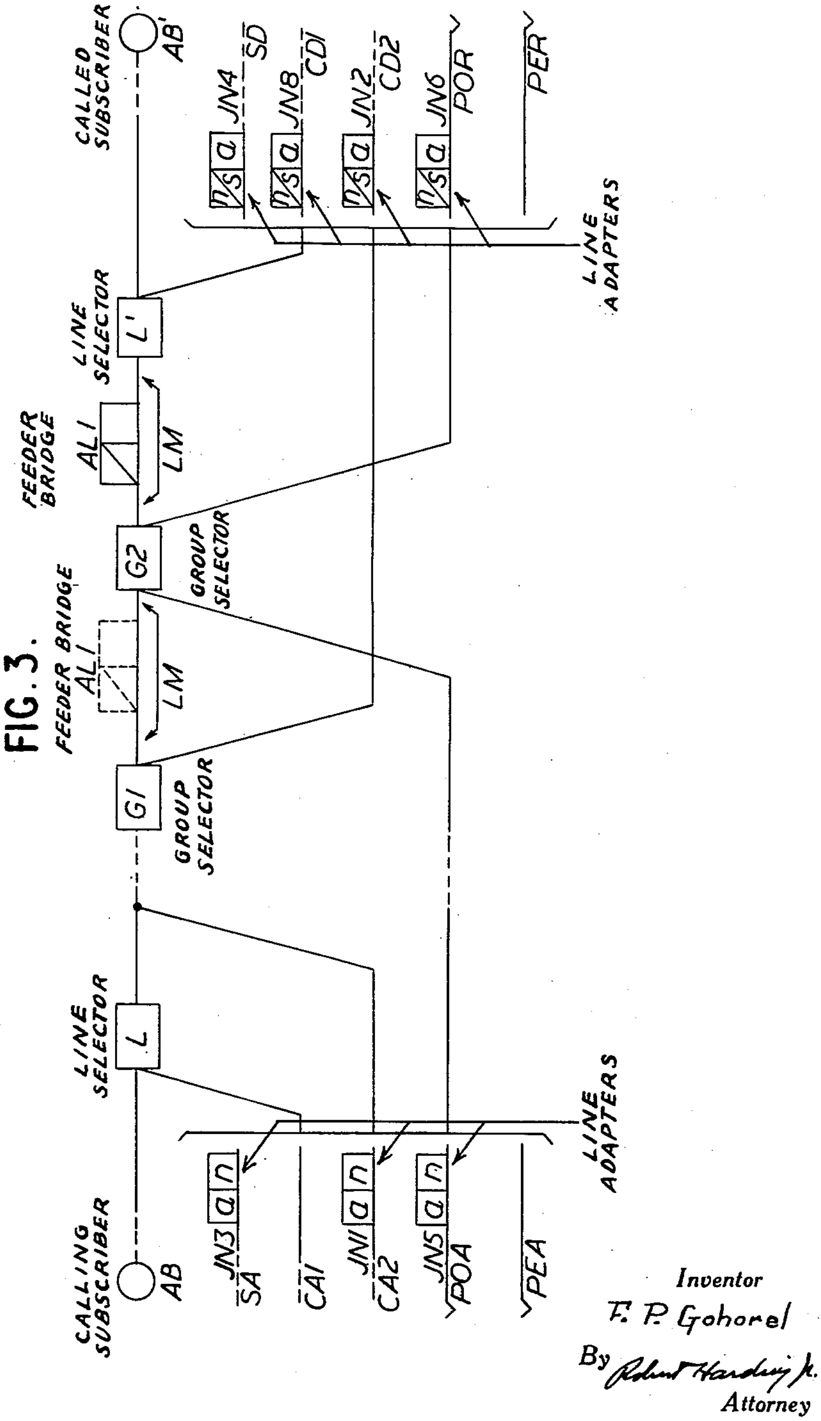
FIG. 3 is a variant of the diagram of FIG. 2 for the case of an exchange having two group-selecting stages.

FIG. 3 covers the case of a larger exchange, comprising a supplementary group selector G2 between first group selector G1 and line selector L′. Depending upon the case, feeder AL1 can be inserted either between group selector G2 and line selector L′ or between group selectors G1 and G2, as shown by a dotted line. Generally, feeder AL1 is and remains located in front of line selector L′ if the second group selector G2 is not installed at the beginning. If, on the contrary, the second group selector G2 is installed upon the creation of the exchange and is used particularly to handle traffic to local subscribers, it may be desirable to locate feeder AL in front of the second group selector G2, but so doing offers no other advantage than to reduce the number of these feeders. As examination of the figure will show, the various called-end circuits can be connected, depending upon the case, to the banks of group selectors G1 or G2 or to the bank of line selectors L′.

Figure 4:
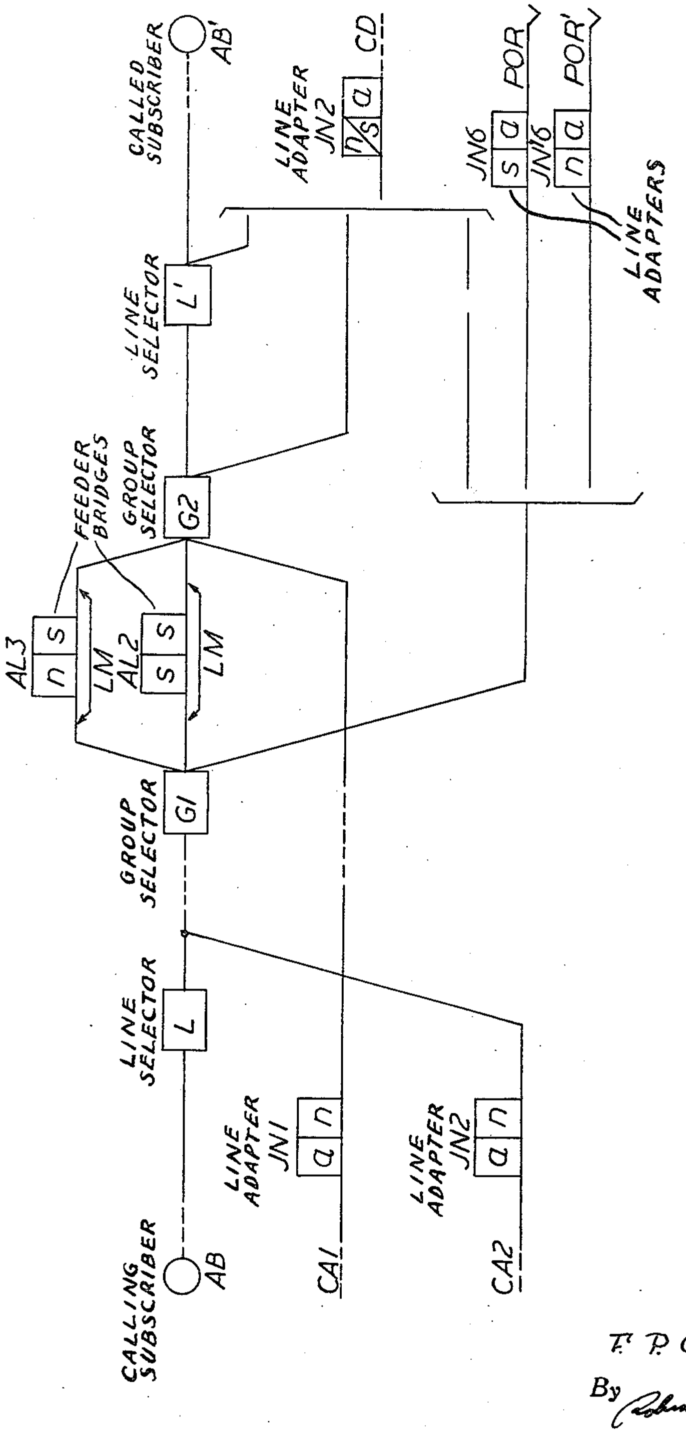
FIG. 4 is a variant of the diagram of FIG. 3 for the use of allotted bridges.

In the case of FIG. 4, allotted bridges are used for certain calls of a specific type. Feeder AL2 is used for calls between two local subscribers. It comprises two sections $s$ respectively supplying the calling and the called subscriber. This same feeder can also be used for calls from local exchanges, these exchanges always being supplied as already described. Feeder AL3 is used for calls from a local circuit, for example, intended for a local subscriber. It comprises one section $n$, adapted to the one of the terminating adapters, and one section $s$ to supply the called subscriber. Adapters JN6 and JN′6, respectively associated with operator positions POR and POR′, are themselves allotted. Adapter JN6 comprises one section $s$ to supply a calling subscriber or a distant local exchange. Adapter JN′6 comprises one section $n$ designed to operate in conjunction with the section $n$ of a terminating adapter such as JN1 or JN2.

Figure 5:
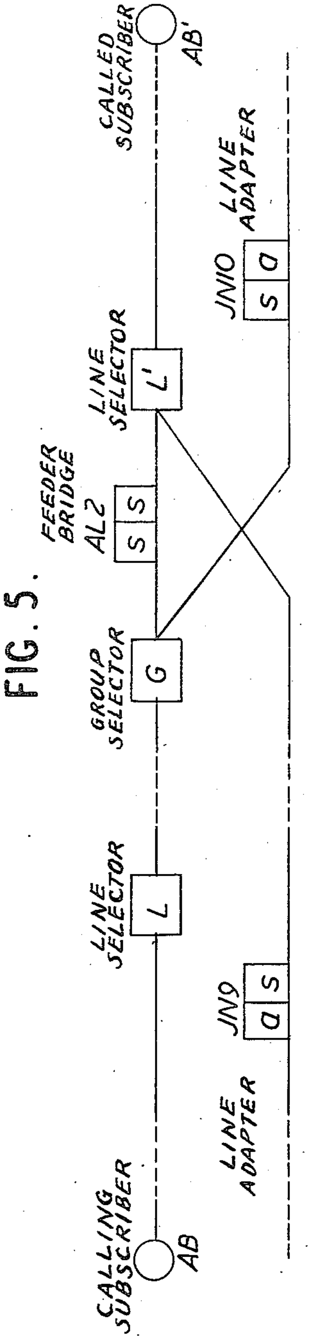
FIG. 5 is a variant of the diagram of FIG. 1 concerning the case of a small-capacity sub-exchange.

FIG. 5 covers the case of a small-capacity sub-exchange wherein all the signaling and supply bridges are allotted. Feeder AL2 is provided exclusively for calls between two local subscribers and comprises two sections $s$ supplying said subscribers. Adapter JN9 is used for a call coming from the exchange serving the calling subscriber and intended for a local subscriber. It comprises one section $a$ for receiving and sending the various signals required for the routing of the call and one section $s$ for supplying the called subscriber. Finally, adapter JN10 is used for calls from a local subscriber AB intended for the exchange serving him. It comprises one section $s$ for supplying the calling subscriber and one section $a$ for the exchange of the signals required to route the call.

The operation of the circuit components that allow the exchange of signals between the originating and the terminating adapter of the central office involved will now be described, with reference to FIG. 6. Throughout what follows it will be assumed that modifiable section $n/s$ of adapter JN2 (FIG. 1) has received from the register the special signal allowing it to adapt itself to section $n$ of terminating adapter JN1, that is, to operate in conjunction with it. The right-hand portion of FIG. 6 corresponds to section $n/s$ of adapter JN2 (FIG. 1), the left-hand portion corresponding to section $n$ of adapter JN1 (FIG. 1).

In the descriptions that follow, the various relays are referenced by groups of two or more letters, the first letter being generally common to all the relays of the same equipment, the second letter or letters identifying the relay within said equipment. The contacts associated with the relays are designated by the same reference as the corresponding relay, followed by one of the digits 1 to 9. Thus, for example, reference *Ac*1 designates the first contact of relay *Ac*. All the relays are shown in unoperated position.

The battery normally used to supply the various relays has its positive pole grounded, chosen as reference potential; however, a special supply battery is available, with its negative pole grounded. Also, three different potentials are available: a negative polarity (negative pole of the regular supply battery), the ground potential or reference potential and a positive polarity (positive pole of the special supply battery). In the description, these potentials will be designated battery, ground and positive battery, respectively.

Figure 6:
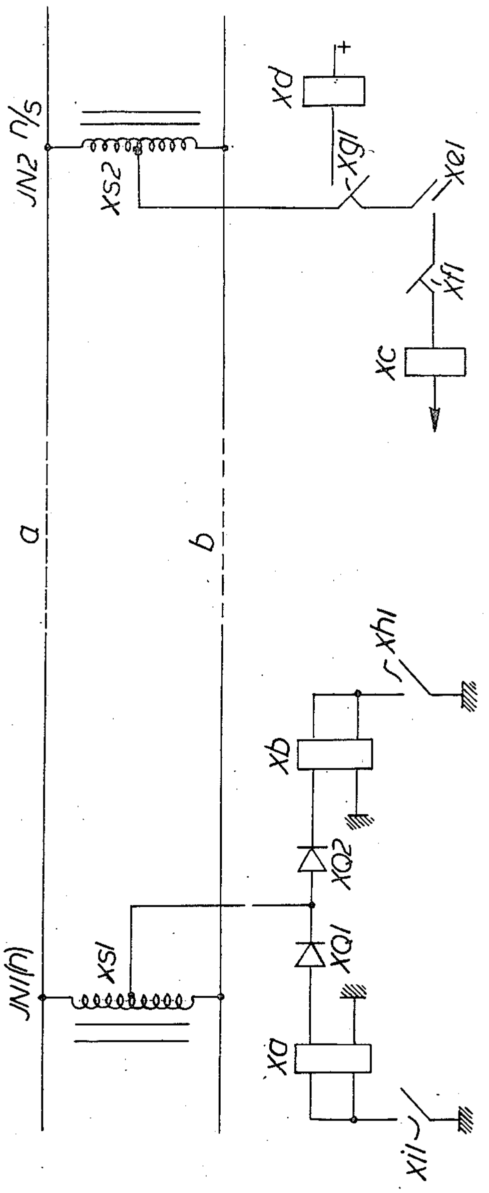
FIG. 6 shows the circuit components required to explain the method of sending the various signals between two bridges located in the same exchange, one at the originating and the other at the terminating end of the selection chain.

During selection the various relays of FIG. 6 are assumed to be in normal position. When selection has ended and if the called subscriber is free, front contact *Xe*1 closes and the following circuit is completed: battery, relay *Xc*, back *Xf*1, front *Xe*1, back *Xg*1, midpoint of self-induction coil XS2, the two halves of said coil in parallel, line wires $a$ and $b$ in parallel, self-induction coil XS1, midpoint of this coil, rectifier XQ1, windings in series of relay *Xa*, ground.

Relay *Xa* pulls up but marginal relay *Xc* remains unoperated owing to the high resistance of the lower winding of relay *Xa*. Relay *Xa* acts then on section $a$ of adapter JN1 in order to control all the necessary operations that will end in the sending of the "subscriber free" signal to the exchange ahead of the exchange involved.

When the called subscriber answers, back contact *Xf*1 opens, thereby causing the release of relay *Xa* in terminating adapter JN1. Said relay then controls the sending of the "subscriber removes handset" signal to the distant exchange.

When the called subscriber hangs up, back contact *Xf*1 closes again, thereby causing the re-energization of relay *Xa* and the sending of the "subscriber hangs up" signal to the distant exchange.

If the party at the distant exchange is an operator, the sending of ringing current to the called subscriber can be placed under that operator's control. The ringing operation is translated, in adapter JN1, into the reception of a suitable signal finally causing the closing of front contact *Xi*1. The high-resistance lower winding of relay *Xa* is short circuited, thereby causing marginal relay *Xc* to energize and to control by any suitable means the sending of ringing current to the called subscriber.

At the end of the call the operator can, by performing an operation that causes anew the sending of ringing current, call back a subscriber that has just replaced his handset. This operation is translated in adapter JN1 into the reception of a signal that causes the closing of front contact *Xi*1, the following operations developing then as described in the preceding paragraph.

When the called subscriber is busy, contact Xg1 shifts to operative position and the following circuit is completed: positive polarity, marginal relay Xd, front Xg1, self-induction coil XS2, line wires a and b in parallel, self-induction coil XS1, rectifier XQ2, windings in series of relay Xb, ground. Relay Xb energizes, but marginal relay Xd remains unoperated owing to the high resistance of the lower winding of relay Xb. Relay Xb then causes, by any suitable means, the sending of the busy signal to the distant exchange.

If the distant exchange's calling operator desires to listen in, a signal is sent to the exchange here under consideration in order to cause, by any suitable means, the closing of front contact Xh1. As a result, the high-resistance lower winding of relay Xb is short circuited and marginal relay Xd energizes, thus bringing about all the operations required to listen in on a busy subscriber. When the listening-in operation ends, contact Xh1 opens and relay Xd releases.

Self-induction coils XS1 and XS2 are so chosen as to allow D.C. signals to be exchanged correctly between adapters JN1 and JN2 without appreciable attenuation of the speaking current.

Figure 1:
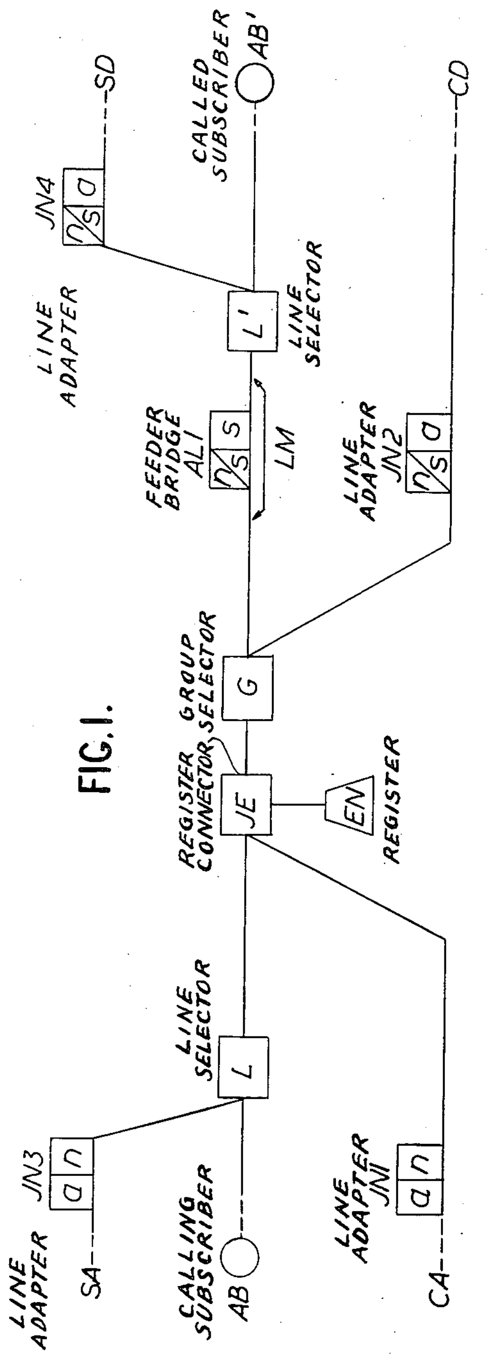
FIG. 1 is a wiring diagram showing the normal position of the signaling and supply bridges in an automatic telephone exchange in accordance with the invention.
Figure 7:
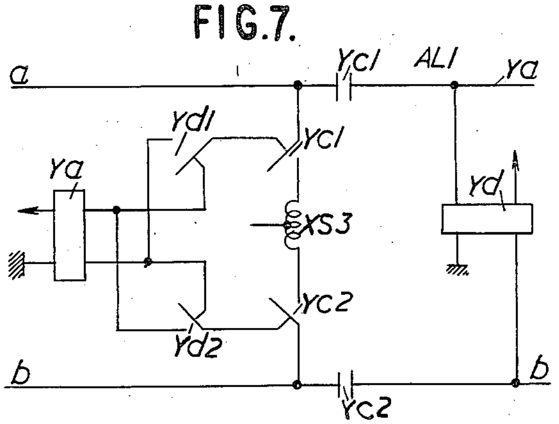
FIG. 7 shows a supply bridge arrangement using self-inductance coils and condensers.

FIG. 7 shows the supply bridges of feeder AL1 of FIG. 1. At the called end, the two line-wires a and b are supplied through relay Yd. At the calling end, the two line-wires a and b can be either looped through self-induction coil XS3 or supplied through a relay Ya; the special signal coming from the register acts upon contacts Yc1 and Yc2 in order to cause the necessary switchings, depending upon whether the caller is a subscriber or a circuit. A tap at the midpoint of self-induction coil XS3 terminates at relays similar to relays Xe and Xd of FIG. 6 in order to allow the exchange of signals between the feeder involved and the adapter associated with the calling circuit. If the calling party is a local subscriber and the called subscriber has answered, relay Yd energizes and over its contacts Yd1 and Yd2 causes the reversal of the calling-end supply polarities. Condensers Yc1 and Yc2 split the two supply bridges, while allowing the passage of the speaking current.

Figure 8:
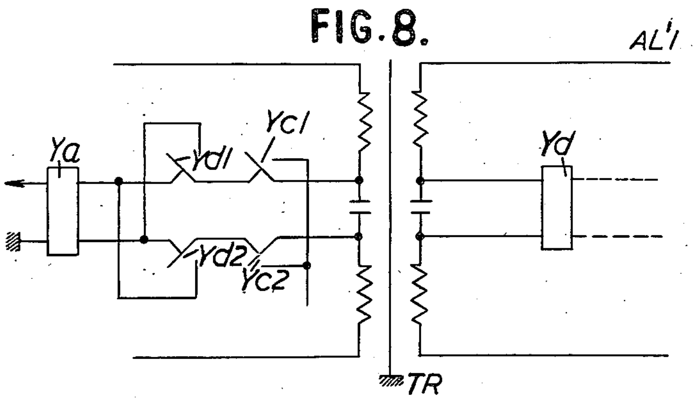
FIG. 8 shows a supply bridge arrangement using a transformer.

FIG. 8 shows a variant of FIG. 7 wherein the two supply bridges are split by a transformer TR. This bridge is to be used when ground-potential differences or disturbances are likely to occur and when poor lines are involved, in order to reduce troublesome noises. Such will be the case for small exchanges, at least for incoming or outgoing calls. In other cases, preference will be given to the use of the supply bridge of FIG. 7, because of its lower cost and because it produces less attenuation.

The detailed operation of the block diagram of a signaling and supply bridge in accordance with the invention will now be described, with reference to FIG. 9. This bridge, referenced A, can be used in the section n/s of an originating feeder or adapter. In this equipment, only the circuit components that are needed in order to be able to understand the invention are shown. All the relays are normally in home position.

Equipment A is seized by means of circuits not shown. The seizure signal (if needed) to the exchange behind is under the control of the register, which applies a certain polarity to incoming wire c. This polarity is sent through back contacts Ag3 and Af4 to a relay not shown and causes the sending of the desired seizure signal.

When equipment A is ready to receive the selective combinations, contact Au1 closes and the two incoming line-wires a and b are looped through the following circuit: wire a, back Ah4, Ag5, Ac1, front Au1, relay At (which remains unoperated), back Ag4, Ah3, Ai1, wire b. Register EN then sends the equipment the various selective combinations required for the routing of the call. Each dialing pulse is received in the form of a supply from wires a and b, causing the energization of relay At, the pulse being thereupon sent from the rearward end by any suitable means. When equipment A has received all the selective combinations, contact Au1 opens.

In accordance with a variant, contact Au1 opens after the reception of one or more digits and does not close again until equipment A has been able to receive the succeeding digits.

When the register has sent equipment A all the selective combinations required to route the call, it sends an end-of-dialing signal, which is translated into the application of positive battery to wire b for a short instant. The following circuit is then completed: positive battery on wire b, back Ai1, Ah3, Ag4, rectifier AQ1, relay Ac, ground. Relay Ac pulls up and energizes relay Af over back Ag1, front Ac4, back Ai2, ground.

Relay Af completes a holding circuit for itself over back Ah1 and front Af1; over its front Af2 it prepares the circuit of relay Ag; over its front Af3 it prepares the circuit of its opposition winding; finally, it causes the sending of a predetermined polarity to the register over wire AF1, front Af4, back Ag3 and wire c. This polarity depends essentially upon the charging method: it is positive if the equipment must record the identity of both subscribers for the purpose of printing a ticket; it is negative if the equipment must simply receive from the register the signal of the charge applied and thereupon send the charge pulses to the calling subscriber's meter; finally, no polarity is sent if the charge applied is special (no metering, simple metering or invariable metering).

At the end of the end-of-dialing signal sent by the register over wire b, relay Ac releases and completes the following circuit over Ac5: battery, relay Ag, back Ac5, front Af2, Af1, back Ai2, ground. Relay Ag energizes.

Relay Ag completes a holding circuit for itself over Ag2; over its front contact Ag1 it prepares the circuit of the opposition winding of relay Af.

The register tests an available auxiliary-trunk circuit CLA over wire a, back Ah4, front Ag5 and back Ak3. If this test is successful, it applies a ground to wire c, thereby energizing relay Al over front Ag3, back Ak2 and back Al1. Relay Al energizes and holds by any suitable means; over its front Al1 it returns wire c to the auxiliary-truck circuit.

Auxiliary-trunk circuit CLA thereupon causes the seizure of a free multipling circuit or trunk-bundle FC. As indicated by the multipling arrows, auxiliary-trunk circuit CLA is common to a certain number of equipments A; also, multipling circuit or trunk bundle FC is common to a certain number of auxiliary-trunk circuits CLA. The seized multipling circuit or trunk bundle FC thereupon sends the register an identity signal over auxiliary-trunk circuit CLA, front Al1, back Ak2, front Ag3 and wire c. This identity signal may, for example, be a predetermined polarity or a combination of alternating currents of different frequencies. Upon receiving this signal, register EN is connected to trunk bundle FC by any suitable means. Said bundle consists essentially of a certain number of wires and allows sending a plurality of selective signals from the register to equipment A in practically instantaneous fashion. If the so-called "two-out-of-five" code is used, and hence five wires per signal, a trunk bundle comprising 5 x n wires will allow sending n signals simultaneously.

Over its front contact Al2, relay Al causes the application of battery to wire b, over the following circuit: resistance AR1, front Al2, back Ak1, front Ag4, back Ah3, Ai1 and wire b. Upon receiving this battery, the register sends all the signals required for charging the call. These signals are sent through trunk bundle FC and auxiliary-trunk circuit CLA; they are thereupon recorded in equipment A by relays not shown since they do not form part of the invention.

When the information required for charging the call has been recorded in equipment A, relay Ak energizes by any suitable means; at Ak1 it removes the battery from wire b in order to signal the register that the information sent has been properly received, the register then releasing trunk bundle FC and auxiliary-trunk circuit CLA; over its front A*k*2, it prepares the operation of the two relays A*m* and A*n*; over its front A*k*3 it prepares the circuit of relays A*j* and A*c*; it also opens the holding circuit (not shown) of relay A*l*.

Where equipment A must record the identity of both subscribers for ticket-printing purposes, the capacity of the trunk bundle may be insufficient to send all the necessary signals simultaneously. After having transmitted part of the information, this bundle is released and then reseized for sending the rest of the information. To obtain this result, relay A*k* is released by any suitable means after the release of the trunk bundle; equipment A is then in the same position as before the seizure of the trunk bundle and the above-described cycle of operations is repeated.

It will first be assumed, throughout what follows, that equipment A must supply line wires *a* and *b* at the calling end. In that case, the register applies positive battery momentarily to wire *a*, the following circuit being completed: wire *a*, back A*h*4, front A*g*5, A*k*3, A*g*6, rectifier AQ1, relay A*c*, which energizes, ground. Over its front A*c*4 and front A*g*1 and A*f*3, relay A*c* completes the circuit of the opposition winding of relay A*f*. The fluxes produced by the two windings of relay A*f* being equal and of opposite direction, relay A*f* releases. Over its front A*c*3 and front A*k*2 and A*g*3, relay A*c* connects wire *c* to the two relays A*m* and A*n*, thereby allowing the sending of certain special orders from the register to equipment A. Thus, for example, if the call is intended for the second subscriber on a party liner, the register applies battery to wire *c*, thereby energizing relay A*m* through rectifier AQ2. Relay A*m* then causes, over the ringing-current sending circuit, all the changes required to reach such second subscriber.

Relay A*f* prepares, over its back contact A*f*2, the circuit of relay A*h*.

When the positive-battery pulse over wire *a* ends, relay A*c* releases and over A*c*5 completes the following circuit: battery, relay A*h*, back A*f*2, A*c*5, front A*g*2, back A*i*2, ground.

Relay A*h* energizes; over A*h*2 it completes a holding circuit for itself; over its front A*h*3 and A*h*4 it supplies the two line-wires over the following circuit: battery, upper winding of relay A*v*, back A*j*1, front A*h*4, wire *a*, wire *b*, back A*i*1, front A*h*3, back A*j*2, lower winding of relay A*v*, ground. Relay A*v* energizes over the calling subscriber's loop.

Once the connection has been established between the two subscribers, a predetermined number of charging pulses, dependent upon the tariff recorded, can be sent over contact A*p*1 to the calling subscriber's meter over the following circuit: battery, resistance AR2, front A*p*1, back A*c*3, front A*k*2, A*g*3 and wire *c*.

When the calling subscriber hangs up, relay A*v* releases.

Equipment A releases by any suitable means. It is possible, for example, to provide a general-holding relay (not shown) controlled by the hanging up of the calling subscriber or the called subscriber or both and the release of which will cause the release of all the relays still in operated position, that is, relays A*g*, A*h*, A*k*, A*m* (and A*v* if the calling subscriber has not hung up as yet).

The case will now be discussed, with reference to FIG. 1, where equipment A must operate in conjunction with section *n* of adapter JN1. When the information required for charging the call has been properly received by equipment A, the register momentarily applies negative battery to wire *a*, the following circuit being then completed: negative battery on wire *a*, back A*h*4, front A*g*5, A*k*3, relays A*j* and A*c* in series, ground. Relay A*c* causes the same operations as in the preceding case, namely, the release of relay A*f* and the energization of relay A*h*. Over its front A*j*1, and A*j*2, relay A*j* loops the two line-wires *a* and *b* over the following circuit: wire *a*, front A*h*4, A*j*1, self-induction coil XS2, front A*j*2, A*h*3, back A*i*1, wire *b*.

The exchange of signals between the equipment A involved and the adapter JN1 of FIG. 1 is then effected as said in the description of FIG. 6. When the selection has been completed and if the called subscriber is free, contact A*d*1 closes, the battery of relay A*s* being then applied to the midpoint of self-induction coil XS2 and thence to line wires *a* and *b* in parallel. When the called subscriber answers, contact A*r*1 opens and battery is removed from line wires *a* and *b*. When the called subscriber hangs up, contact A*r*1 closes again; the battery of relay A*s* is then applied again in parallel to the line wires. Finally, if there is called-subscriber call-back, the terminating adapter JN1 of FIG. 1 causes the application of ground to line wires *a* and *b* through a low resistance, thus causing the energization of marginal relay A*s*, which controls the call-back by any suitable means.

The case will now be discussed where a metallic connection must be established between the incoming and outgoing line-wires *a* and *b* of equipment A. As stated in the description of FIG. 1, line selector L' is directed to an adapter JN4 associated with circuit SD in the case of a call intended for a satellite and feeder AL1 must be eliminated. Before sending the selective combinations to the satellite, the register momentarily applies a positive polarity to wire *b*, as well as a negative polarity to wire *a*. The following circuit is completed: positive battery on wire *b*, back A*i*1, A*h*3, A*g*4, rectifier AQ1, relay A*c*, battery. Relay A*c* energizes and causes the energization of relay A*f*, as stated in the description of the general case; moreover, it completes the following circuit over its front A*c*1: negative battery on wire *a*, back A*h*4, A*g*5, front A*c*1, relay A*i*, which energizes, ground.

Through the opening of its back A*i*1, relay A*i* prepares the isolation of line wire *b*, which becomes effective after the release of relay A*c* and the opening of front A*c*2; at A*i*2 it opens the circuit of relay A*f* and prevents the subsequent operation of relays A*g* and A*h*. When the metallic-connection signal (positive battery on wire *b* and negative on wire *a*) is suppressed, relay A*c* releases but relay A*i* holds by any suitable means. Metallic continuity is established across equipment A through line wires *a* and *b*; any shunt is eliminated through the opening of back A*i*1 and A*g*5. Equipment A ceases to perform any function; the rest of the dialing pulses, as well as any subsequent orders, are transmitted directly from the register to the originating adapter JN4 of FIG. 1.

At the end of the call, the release is effected by any suitable means. It is possible, for example, to provide a general-holding relay whose return to normal is controlled by one of the two adapters JN1 or JN4 of FIG. 1, said relay upon releasing causing the return to normal of all the other relays.

This possibility of eliminating the signaling bridge can be used to take care of exceptional cases, for it allows the use of some other bridge or termination meeting the special requirements of such exceptional cases.

The applications of the FIG. 9 block diagram to different types of connectors or feeders will now be described, with reference to FIGS. 10 to 14. Of course, in each of these applications, generally only part of the previously-described arrangements will be used.

Figure 10:
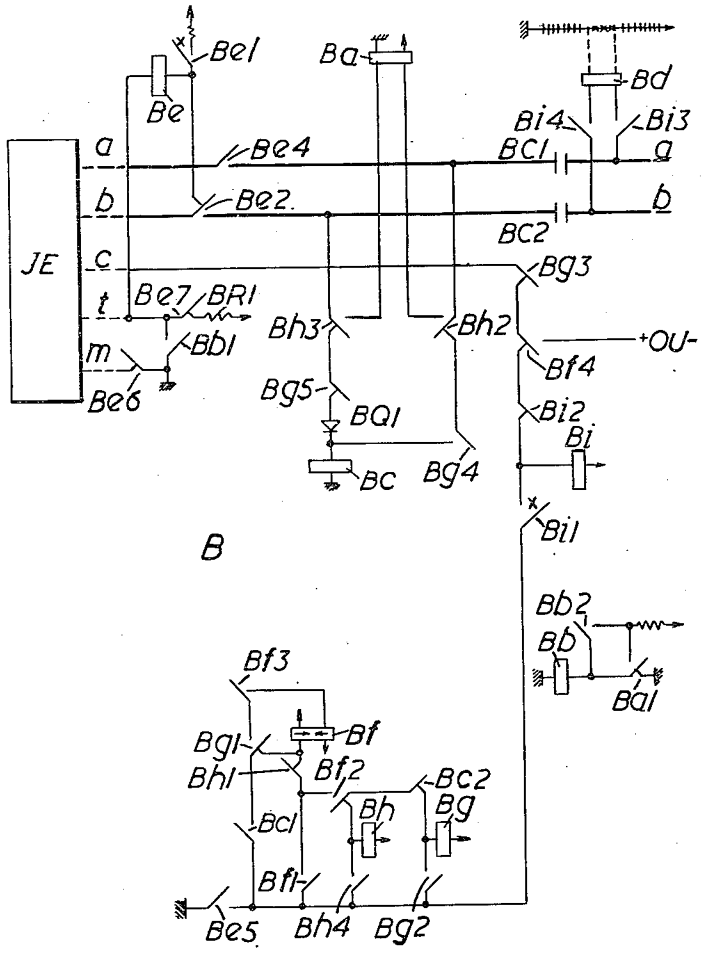
FIG. 10 shows the application of the FIG. 9 diagram to the case of a line adapter to an exchange receiving the dialing pulses as multifrequency signals.

FIG. 10 shows the circuit components of an originating adapter between exchanges of the type receiving the selective combinations in the form of multifrequency signals.

When adapter B is available, all its relays are in normal position; wire *t* is then connected to battery through back contact B*e*7 and resistance BR1; wire *m* is grounded through back contact B*e*6.

Adapter B is seized by applying ground to wire *t* and battery to wire *b*, thereby causing the energization of relay B*e*. Over B*e*1, relay B*e* completes a holding circuit for itself; over its front contacts B*e*2 and B*e*4 it establishes the continuity of line wires $a$ and $b$ through condensers BC1 and BC2; over its front contact B$e$5 it prepares the operation of a chain of metering relays B$f$, B$g$, B$h$ similar in all respects to chain A$f$, A$g$ A$h$ of FIG. 9; over B$e$6 and B$e$7 it removes the availability polarities from wires $m$ and $t$.

When the seizure signal must be sent to the distant exchange, the register grounds wire $c$, thereby causing the energization of relay B$i$ over back contacts B$g$3, B$f$4 and B$i$2. Relay B$i$ holds over front contacts B$i$1 and B$e$5; over B$i$2 it makes a break in wire $c$ so as to be able to use this wire for other purposes; over its front contacts B$i$3 and B$i$4 it controls the supplying of line wires $a$ and $b$ through relay B$d$, this action corresponding to the sending of a seizure signal to the distant exchange.

In accordance with a variant, the sending of the seizure signal to the distant exchange can be done by looping the line wires instead of supplying them; it then suffices to eliminate the crossed-dash connections and to establish the "$x$" connections.

The various selective combinations are sent by the register of the exchange involved to the distant exchange in the form of multifrequency signals, over the following circuit: wire $a$, front B$e$4, condenser BC1, wire $a$, wire $b$, condenser BC2, front B$e$2, wire $b$.

At the end of the dialing, the register momentarily applies positive battery to wire $b$, thereby energizing relay B$c$ over front contact B$e$2, back contacts B$h$3, B$g$5 and rectifier BQ1.

A ground pulse is sent over contacts B$e$5 and B$c$1 to metering chain B$f$, B$g$, B$h$. A polarity dependent upon the charging method adopted, as has been explained in the description of the block diagram of FIG. 9, is applied to wire $c$ for the duration of that pulse, over front contact B$f$4 and back contact B$g$3. When the end-of-dialing signal consisting in the application of positive battery to wire $b$ has been fully received, relay B$c$ releases and relay B$g$ energizes. Over its front contact B$g$4, relay B$g$ prepares the circuit of relay B$c$ for the reception of the next signal coming from the register.

The register thereupon momentarily applies positive battery to wire $a$. The following circuit is then completed: wire $a$, front B$e$4, back B$h$2, front B$g$4, relay B$c$, ground. In accordance with the method explained in the description of FIG. 9, the ground pulse sent over front contact B$c$1 causes the release of differential relay B$f$ and the energization of relay B$h$. The calling-end line wires are then supplied over the following circuit: battery, right-hand winding of relay B$a$, front B$h$2, B$e$4, wire $a$, wire $b$, front B$e$2, B$h$3, left-hand winding of relay B$a$, ground. Relay B$a$ energizes and over its front B$a$1 causes the energization of relay B$b$.

Relay B$b$ completes a holding circuit for itself over B$b$2; over B$b$1 it applies a ground to wire $t$ taking the place of the ground previously applied by the devices located ahead; therefore, the holding of the various devices seized is from then on under the control of adapter B.

The connection is established over the following circuit: wire $a$, front B$e$4, condenser BC1, wire $a$, wire $b$, condenser BC2, front B$e$2 and wire $b$.

At the end of the call, the loop is removed from the calling-end line wires $a$ and $b$, thereby causing the release of relay B$a$, which over its back B$a$1 short-circuits relay B$b$, which releases in turn. Over B$b$1, relay B$b$ removes the ground from wire $t$, thereby causing the release of relay B$e$, along with the release of the devices located ahead. Over B$e$5, relay B opens the circuit of metering relays B$g$, B$h$ and over B$e$6, B$e$7 it restores the availability polarities on wires $m$ and $t$. Relay B$i$ also releases, its circuit being opened over B$e$5, and over B$i$3 and B$i$4 causes the release of relay B$d$, as also the release of the devices of the exchange located behind.

Figure 11:
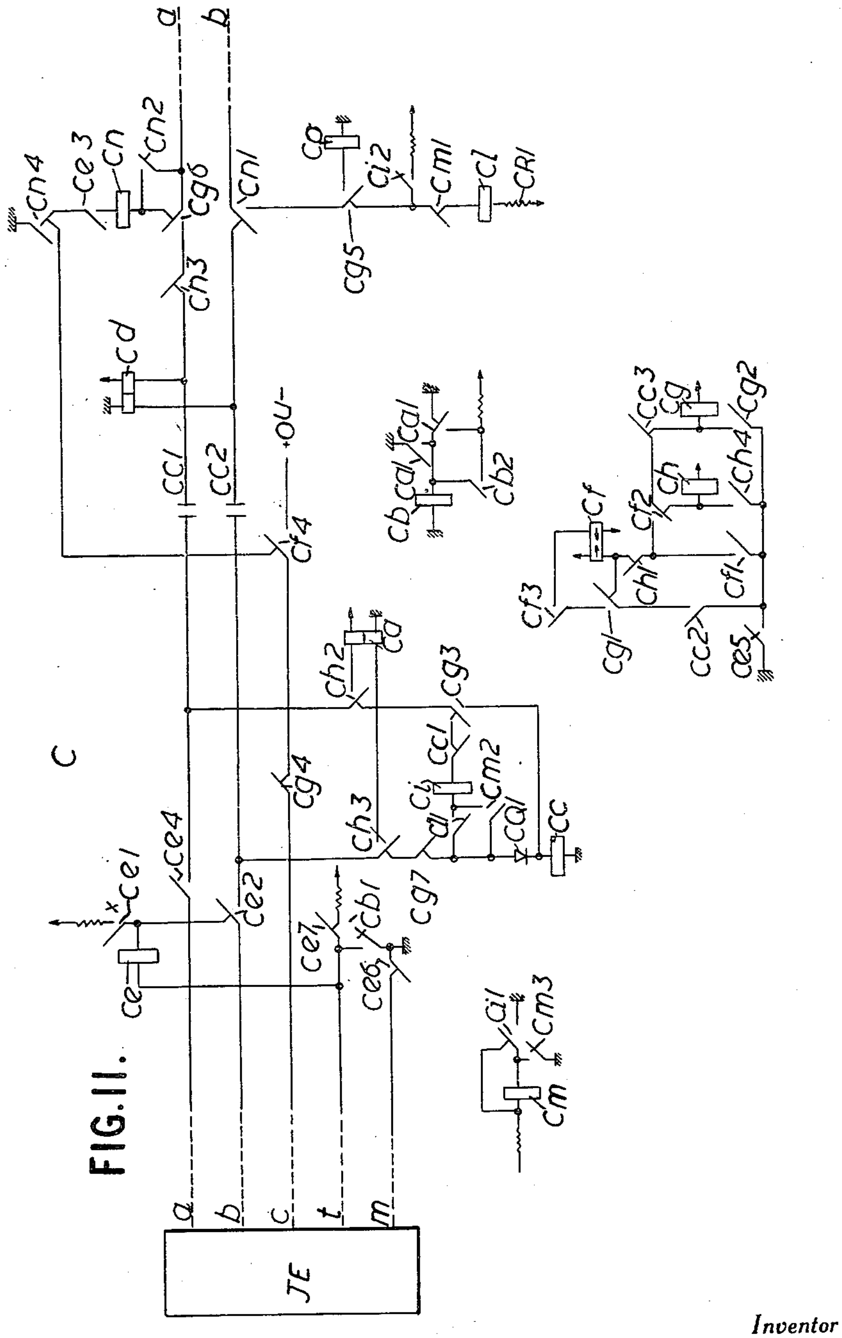
FIG. 11 shows the application of the FIG. 9 diagram to the case of a line adapter to an exchange receiving D.C. dialing pulses.

The detailed operation of an adapter to an exchange of the type receiving the seizure signal over wire $a$ and the D.C. selective combinations over wire $b$ will now be described, with reference to FIG. 11. When this adapter is free, all the relays are in home position; wire $m$ is grounded over contact C$e$6 and wire $t$ is connected to battery over contact C$e$7.

The adapter is seized by applying ground to wire $t$ and battery to wire $b$, thereby energizing relay C$e$. Relay C$e$ completes a holding circuit for itself over contact C$e$1; over its front contacts C$e$2, C$e$4 it prepares the speaking circuit; over its front contact C$e$3 it prepares the sending of the seizure signal to the distant exchange; over C$e$5 it switches in a metering chain consisting of relays C$f$, C$g$, C$h$, similar in all respects to chain A$f$, A$g$, A$h$ of FIG. 9$e$; over C$e$6 and C$e$7 it removes the availability polarities from wires $m$ and $t$.

When the seizure signal must be sent to the distant exchange, the register grounds wire $c$, the following circuit being then completed: ground on wire $c$, back C$g$4, C$f$4, C$n$4, front C$e$3, relay C$n$, which energizes, back C$g$6, wire $a$ and battery through a seizure relay located at the distant exchange. Over its front C$n$2, C$n$4, relay C$n$ completes a holding circuit for itself; over its front C$n$1 it prepares the invitation-to-send-signal receiving circuit, as well as the circuit used for sending the dialing pulses to the distant exchange.

When the distant exchange is ready to receive the dialing pulses, it causes the application of ground to wire $b$, the following circuit being then completed: ground on wire $b$, front C$n$1, back C$g$5, C$m$1, relay C$l$, which energizes, resistance CR1, battery. Relay C$l$ loops the calling-end line wires $a$ and $b$ over the following circuit: wire $a$, front C$e$4, back C$h$2, C$g$3, C$c$1, relay C$i$, front C$l$1, back C$g$7, C$h$3, front C$e$2, wire $b$.

The register of the exchange involved then sends the various selective combinations required to route the call, each pulse resulting from supplying line wires $a$ and $b$, which causes the energization of relay C$i$. The pulses are sent to the distant exchange over front C$i$2, back C$g$5, front C$n$1 and wire $b$.

At the beginning of the first dialing pulse, relay C$m$ energizes over its front contact C$i$1 and thereupon holds over its own contact C$m$3, in spite of the brief short-circuitings it suffers through back contact C$i$1. At C$m$1 it opens the circuit of relay C$l$, which releases; at C$m$2 it provides the continuity of the dialing-pulse receiving circuit to relay C$i$ following the opening of contact C$l$1.

After full reception of the first dialing-pulse train, relay C$m$ releases, being short-circuited for a long time by back contact C$i$1. At C$m$1 it again switches in relay C$l$, in order to prepare the reception of the invitation-to-send signal corresponding to the second digit.

At the end of the dialing, the register of the exchange involved momentarily applies positive battery to wire $b$, relay C$c$ energizing then over the following circuit: positive polarity on wire $b$, front C$e$2, back C$h$3, C$g$7, rectifier CQ1, relay C$c$, ground. The ground pulse momentarily sent to the metering chain through contact C$c$2 causes the energization of relays C$f$ and C$g$ in succession.

A predetermined polarity in line with the charging method adopted is applied to wire $c$ over front contact C$f$4 and back contact C$g$4.

Over its front contact C$g$3, relay C$g$ prepares the circuit of relay C$c$ for the reception of the next signal coming from the register; over its front contact C$g$6 it prepares the supplying of the called-end line wires $a$ and $b$.

When the selection of the called subscriber has been completed at the distant exchange, this exchange makes a break in wire $a$ and relay C$n$ releases. Over its back contacts C$n$1, C$n$3, relay C$n$ supplies the called-end line wires $a$ and $b$ over the following circuit: battery, right-hand winding of relay C$d$, back C$n$3, front C$g$6, wire $a$, wire $b$, back C$n$1, left-hand winding of relay C$d$, ground. Relay C$d$ does not energize over this circuit, owing to a high resistance at the distant exchange. Further, the supplying of line wires *a* and *b* allows holding that exchange's devices.

To switch in the calling-end supply bridge, the register momentarily applies positive battery to wire *a*, the following circuit being then completed: positive battery on wire *a*, front C*e*4, back C*h*2, front C*g*3, relay C*c*, ground. The ground pulse sent to the metering chain over contact C*c*2 causes, in accordance with a method already described, the release of relay C*f* and the energization of relay C*h*. The calling-end line wires *a* and *b* are then supplied over battery, upper winding of relay C*a*, front C*h*2, C*e*4, wires *a* and *b*, front C*e*2, C*h*3, lower winding of relay C*a*, ground.

Relay C*a* energizes and over its front contact C*a*1 causes the energization of relay C*b*.

Relay C*b* completes a holding circuit for itself at C*b*2; at C*b*1 it applies a ground to wire *t* replacing the one previously applied by the devices located ahead; therefore, the holding of the various devices seized is then under the control of adapter C.

When the called subscriber answers, the high resistance applied between line wires *a* and *b* by the exchange behind is removed and relay C*d* energizes.

The connection between the two subscribers is established over wire *a*, front C*e*4, condenser CC1, back C*n*3, front C*g*6, wires *a* and *b*, back C*n*1, condenser CC2, front C*e*2, wire *b*.

At the end of the call, the loop is removed from the calling-end wires *a* and *b* and relay C*a* releases, short-circuiting, over its back contact C*a*1, relay C*b*, which releases in turn.

At C*b*1, relay C*b* removes the ground from wire *t*, thereby causing the release of relay C*e*, as well as the release of the devices located ahead of the exchange involved.

Relay C*e* opens at C*e*5 the circuit of relays C*g*, C*h*, which release. At C*e*6, C*e*7 it restores the availability polarities on wires *m* and *t*.

Relay C*g* opens over its front contact C*g*6 the circuit of wire *a*, thereby causing the release of relay C*d* and the release of the devices located at the distant exchange.

If the called subscriber is busy, the distant exchange holds the battery on wire *a* at the end of the selection and relay C*n* remains operated. On the other hand, it applies battery to wire *b*, which energizes relay C*o* over front contacts C*n*1, C*g*5. Relay C*o* short-circuits at C*o*1 relay C*b*, which falls back and causes the release as in the preceding case.

Figure 12:
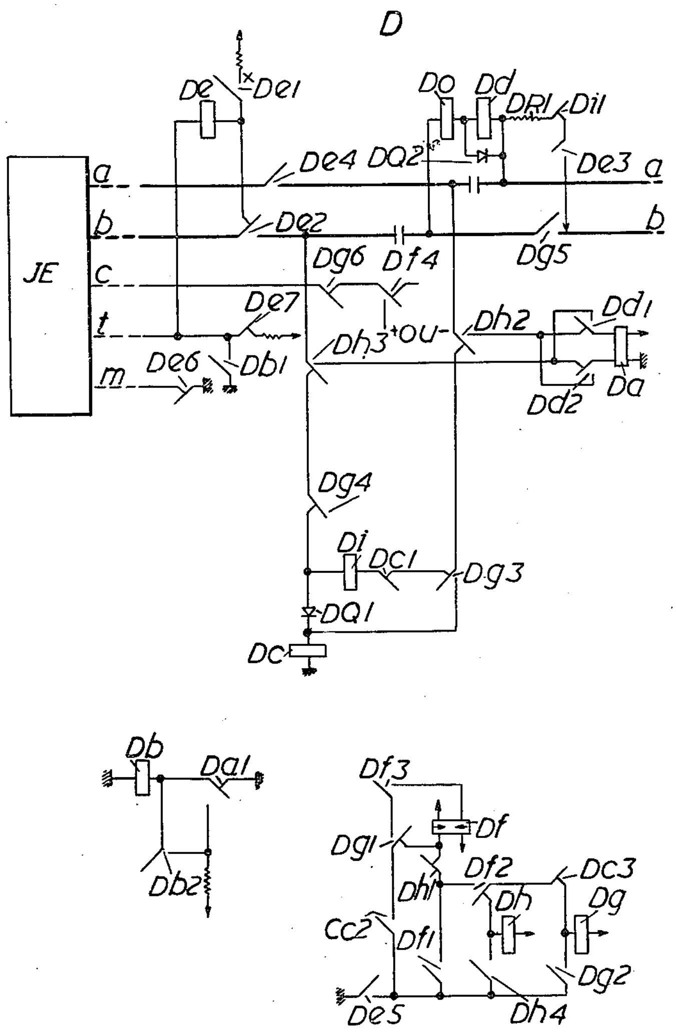
FIG. 12 shows the application of the FIG. 9 diagram to the case of a line adaptor to a battery supplying exchange.

The circuit components of an originating adapter to an exchange that always supplies the calling end will now be described, with reference to FIG. 12.

When this adapter, referenced D, is free, all its relays are in normal; a ground is always applied to wire *m* over back contact D*e*6, battery being applied to wire *t* over contact D*e*7.

This adapter is seized by applying ground to wire *t* and battery to wire *b*, thereby causing the energization of relay D*e*. At D*e*1, relay D*e* completes a holding circuit for itself; over its front contacts D*e*2, D*e*4, it prepares the speaking circuit; at D*e*3 it loops the two called-end line wires *a* and *b* across resistance DR1, this action corresponding to the sending of a seizure signal to the distant exchange; at D*e*5 it switches in a metering chain consisting of relays D*f*, D*g*, D*h*, similar in all respects to metering chain A*f*, A*g*, A*h* of FIG. 9; at D*e*6, D*e*7, it removes the availability polarities from wires *m* and *t*.

The register of the exchange involved then sends adapter D the various selective combinations required to route the call. Each pulse results from the supplying of the calling-end line wires *a* and *b* and causes the energization of relay D*i* over wire *a*, front D*e*4, back D*h*2, D*g*3, D*c*1, relay D*i*, back D*g*4, D*h*3, front D*e*2, wire *b*. At the called end the pulses are sent in the form of loop breaks through the opening of back contact D*i*1.

At the end of the dialing, the register momentarily applies positive battery to wire *b*, the following circuit being then completed: battery on wire *b*, front D*e*2, back D*h*3, D*g*4, rectifier DQ1, relay D*c*, ground. The ground pulse sent over contact C*c*2 causes, in accordance with a method already described, the energization of relays D*f* and D*g* in succession.

A predetermined polarity dependent upon the charging method adopted is applied to wire *c* over front contact D*f*4 and back contact D*g*6.

Over its front contact D*g*3, relay D*g* prepares the reception by relay D*c* of the next signal coming from the register; over its front contact D*g*5 it loops the two called-end line wires *a* and *b* to the two relays D*o* and D*b*. The supply current from the distant exchange is sent over the following circuit: negative battery on wire *a*, rectifier DQ2, relay D*o*, which energizes, front D*g*5, wire *b*.

To switch in the calling-end supply bridge, the register momentarily applies positive battery to wire *a*, the following circuit being completed: battery on wire *a*, front D*e*4, back D*h*2, front D*g*3, relay D*c*, ground. The ground pulse sent over front C*c*2 to metering chain D*f*, D*g*, D*h* causes, as has been said, the release of relay D*f* and the energization of relay D*h*.

Relay D*h* supplies the two calling-end line wires over: battery, upper winding of relay D*a*, which energizes, back D*d*1, front D*h*2, D*e*4, wire *a*, wire *b*, front D*e*2, D*h*3, back D*d*2, lower winding of relay D*a*, ground.

Relay D*a* causes the energization of relay D*b* over its front D*a*1.

Relay D*b* completes a holding circuit for itself over D*b*2; at D*b*1 it applies a ground to wire *t* replacing the ground previously applied by the devices located ahead; the holding of the various devices seized is then under the control of adapter C.

When the subscriber answers, the supply polarities are reversed on the called-end line wires *a* and *b*; therefore, the current can no longer flow through rectifier DQ2 and it borrows relay D*d*, which energizes. At D*d*1 and D*d*2, relay D*d* reverses the calling-end supply polarities to provide supervision of the called-subscriber's answer.

At the end of the call, the loop is removed from the calling-end line wires *a* and *b* and relay D*a* releases, short-circuiting, over its back contact D*a*1, relay D*b*, which releases in turn.

At D*b*1 relay D*b* removes the ground from wire *t*, thereby causing the release of the devices located ahead, along with the release of relay D*e*.

Relay D*e* opens at D*e*5 the holding circuit of the relays of metering chain D*g*, D*h*; at D*e*6 and D*e*7 it restores the availability polarities on wires *m* and *t*.

At D*g*5 relay D*g* removes the loop from called-end line wires *a* and *b*, thereby releasing relays D*o*, D*d*, as well as the various devices located at the distant exchange.

The detailed schematic of a feeder that allows establishing a metallic connection, as well as access to party-line subscribers, will now be described, with reference to FIG. 13.

When this feeder, referenced E, is free, all its relays are in normal; availability circuits are completed over wire *t* and over wire *m* and contact E*e*8. The availability polarities allowing the test by the preceding selector are applied to line selector L' and are not shown.

The feeder is seized by applying ground to wire *t* and battery to wire *b*, thus energizing relay E*e*. At E*e*1 relay E*e* completes a holding circuit for itself; over its front contacts E*e*2 and E*e*3 it prepares the speaking circuit; at E*e*4 it establishes the continuity of wire *c*; at E*e*6 it switches in a metering chain consisting of relays E*f*, E*g*, E*h*, similar in all respects to metering chain A*f*, A*g*, A*h* of FIG. 9; at E*e*7 it prepares energizing circuit for relays E*i* and E*k*; at E*e*8 it makes a break on wire *m* to busy the feeder involved.

The dialing pulses are sent to line selector L' over: calling-end wire *a*, front E*e*3, back E*g*6, called-end wires *a* and *b*, back E*g*7, E*c*1, front E*e*2, wire *b*.

At the end of the dialing, the register of the exchange involved momentarily applies positive battery to wire *b*, the following circuit being completed: positive battery on wire *b*, front E*e*2, back E*i*1, E*g*4, rectifier EQ1, relay E*c*, which energizes, ground. The ground pulse sent over contact E*c*4 to metering chain E*f*, E*g*, E*h* causes, in accordance with a method already described, the energization of relays E*f*, E*g* in succession.

In the case of feeder E, no polarity is sent over wire *c* to the register, because this feeder is designed only for simple metering.

Over its front contacts E*g*3, E*g*4 relay E*g* prepares the circuit of relays E*j* and E*c* for the reception of the next signal coming from the register; over E*g*6 and E*g*7 it makes a break on each of line wires *a* and *b*.

Throughout what follows it will be assumed to begin with that line wires *a* and *b* must be supplied. To that end, the register momentarily applies positive battery to calling-end wire *a*, the following circuit being completed: positive battery on wire *a*, front E*c*3, back E*h*2, front E*g*3, E*g*4, rectifier EQ1, relay E*c*, ground. Relay E*c* energizes during the reception of this signal. The ground pulse sent over contact E*c*4 to metering chain E*f*, E*g*, E*h* causes, in accordance with a method already described, the release of relay E*f* and then the energization of relay E*h*.

Relay E*h* supplies calling-end wires *a* and *b* over: battery, left-hand winding of relay E*a*, back E*d*1, E*j*2, front E*h*2, E*e*3, wire *a*, wire *b*, front E*e*2, back E*c*1, front E*h*4, back E*j*3, E*d*2, right-hand winding of relay E*a*, ground.

Relay E*a* causes the energization of relay E*b* over its front contact E*a*1 and resistance ER3.

Relay E*b* holds over its front contact E*b*2; at E*b*1 it applies a ground to wire *t* replacing the ground previously applied by the devices located ahead; the holding of the various devices seized is therefore then under the control of feeder E.

When the selection of the called subscriber has ended, ringing current is sent to him over: ground, ringing-current generator EG, resistance ER1, back E*n*4, E*k*1, E*l*5, E*m*1, front E*h*5, wire *a*, wire *b*, front E*h*6, back E*m*2, E*l*6, E*k*2, E*n*5, relay E*o*, back E*k*3, resistance ER2, positive battery. Relay E*o*, slow releasing, is not affected by the ring A.C.

The ringing current is shunted through back contact E*d*6, middle winding of relay E*d*, condenser EC3 and ground; by induction it flows into the other two windings of relay E*d*, the calling subscriber then receiving the ringing tone over: battery, left-hand winding of relay E*d*, condenser EC1, front E*h*2, E*e*3, wire *a*, wire *b*, front E*e*2, back E*c*1, front E*h*4, condenser EC2, right-hand winding of relay E*d*, ground.

When the called subscriber answers, line wires *a* and *b* are looped metallically through his handset and relay E*o* is energized by the D.C. superimposed on the ringing generator's current.

At E*o*1 relay E*o* completes the following circuit: battery, resistance ER4, relay E*l*, front E*o*1, back E*f*1, E*i*3, front E*e*6, ground.

Relay E*l* completes a holding circuit for itself at E*l*4; at E*l*5, E*l*6 it stops the sending of ringing current and opens the circuit of relay E*o*, which releases; at E*l*2, E*l*3 it supplies the called subscriber over: battery, left-hand winding of relay E*d*, which energizes, front E*l*2, wire *a*, wire *b*, front E*l*3, right-hand winding of relay E*d*, ground; over its front contact E*l*1 it prepares the sending of a charging pulse to the calling subscriber's meter.

At E*d*1, E*d*2 relay E*d* reverses the calling-end supply polarities to provide supervision of the called subscriber's answer; over its front contact E*d*3 it causes the energization of relay E*m*: battery, left-hand winding of relay E*m*, front E*d*3, back E*i*3, front E*e*6, ground.

Relay E*m* holds over its front E*m*4, back E*f*1, E*i*3, front E*e*6 and ground; over its back E*m*1, E*m*2 it makes a break in the ringing-current sending circuit to prevent restoration of this current after the subsequent reclosing of contacts E*l*5, E*l*6; over its front E*m*1, E*m*2 it completes a new supply circuit for the called subscriber: battery, left-hand winding of relay E*d*, front E*m*1, E*h*5, wire *a*, wire *b*, front E*h*6, E*m*2, right-hand winding of relay E*d*, ground. The first supply circuit described for the called subscriber must in fact subsequently be opened at E*l*2, E*l*3. Over its front contact E*m*3 relay E*m* causes the sending of a charging pulse to the calling subscriber's meter: battery, resistance ER5, front E*l*1, E*m*3, back E*c*3, front E*e*4, wire *c*. At E*m*7 it short-circuits relay E*l*, which releases with a certain lag.

Relay E*l* opens its front contact E*l*1 to stop the charging pulse sent to the calling subscriber's meter; over its back contact E*l*1 it restores the continuity of wire *c* through feeder E: wire *c*, front E*e*4, back E*c*3, front E*m*3, back E*l*1, wire *c*.

The connection between the calling and the called subscriber is established over: calling-end wire *a*, front E*e*3, E*h*2, condenser EC1, front E*m*1, E*h*5, wire *a*, wire *b*, front E*h*6, E*m*2, condenser EC2, front E*h*4, back E*c*1, front E*c*2, wire *b*.

It will be assumed to begin with that the called subscriber hangs up first, relay E*d* releasing, its circuit being opened through said subscriber's loop. At E*d*1, E*d*2 it again reverses the calling-end supply polarities, to provide supervision of the hanging up by the called party.

When the calling subscriber hangs up in turn, relay E*a* releases, short-circuiting, over its back E*a*1, relay E*b*, which releases in turn.

Over E*b*1 relay E*b* removes the ground from wire *t*, thereby causing the release of relay E*e*, together with the release of the various devices located both ahead and behind.

Over E*e*6 relay E*e* opens the circuit of metering relays E*g*, E*h* and the circuit of relay E*m*; at E*e*8 it restores the continuity of availability wire *m*.

If the calling subscriber hangs up first, relay E*a* releases and causes the various operations indicated in the preceding case; called-subscriber supply relay E*d*, having its circuit opened at E*m*1, E*h*5, E*h*6, E*m*2, releases in turn.

If the called subscriber hangs up first and the calling subscriber is slow in hanging up in turn, arrangements have been provided to release feeder E after a predetermined period of time. After the called subscriber hangs up, cam ECA1 is connected to the left-hand winding of relay E*n* over back E*j*4, front E*m*6, back E*d*4. Relay E*n* pulls up when this cam closes its contact. At E*n*1 it completes the following holding circuit for itself: battery, right-hand winding of relay E*n*, front E*n*1, back E*d*3, E*i*3, front E*e*6, ground; at E*n*2 it prepares the circuit of cam ECA2; at E*n*3 it prepares the short-circuiting of general holding relay E*b*.

After a predetermined lag, cam ECA2 in turn closes its contact, thus completing the circuit of the right-hand winding of relay E*m* over E*m*5 and E*n*2. The fluxes produced by the two windings of relay E*m* being equal and of opposite direction, said relay releases, short-circuiting at E*m*9 and E*n*3 relay E*b*, which releases in turn. The release is then effected in accordance with a method similar to the one already described.

From the foregoing explanations it follows that the release occurs upon the hanging up either by the calling or by the called subscriber. However, in the latter case, the release is slowed in order to prevent untimely release by unintended breaks of the line wires.

It will now be assumed that the feeder must operate in conjunction with a terminating adapter such as the adapter JN1 shown in FIG. 1. It is then necessary, as has been stated, to cause in feeder E the changes required to allow the exchange of signals between said feeder and adapter JN1. To that end, after having sent the end-of-dialing signal, the register applies negative battery to calling-end wire *a*. The following circuit is then completed: battery on wire *a*, front E*e*3, back E*h*2, front E*g*3, relay E*j* and relay E*c*, which energize in series.

The ground pulse sent over contact E*c*4 to metering chain E*f*, E*g*, E*h* causes, in accordance with a method already described, the release of relay E*f* and the energization of relay E*h*.

Relay E*j* holds over front contacts E*j*1, E*e*6 and ground; over its front E*j*2, E*j*3 it prepares the switching in of looped self-induction coil XS2; at E*j*4 it switches in cam ECA1; in effect, in the case here under consideration, an incoming call is involved and the release must not be placed under the control of the called subscriber; the party at the exchange ahead may be an operator and must be able to bring about the release only when she desires it.

Relay E*h* loops calling-end line wires *a* and *b* to self-induction coil XS2: wire *a*, front E*e*3, E*h*2, E*j*2, self-induction coil XS2, front E*j*3, E*h*4, back E*c*1, front E*e*2, wire *b*.

When the selection of the called subscriber has ended (something that in practice occurs at the same time as the reception of the end-of-dialing signal and even a little earlier), battery is applied to calling-end line wires *a* and *b* over the following circuits:

(1) Battery, left-hand winding of relay E*f*, back E*d*5, lower half of the winding of self-induction coil XS2, front E*j*2, E*h*2, E*e*3, wire *a*.

(2) Battery, left-hand winding of relay E*f*, back E*d*5, upper half of the winding of self-induction coil XS2, front E*j*3, E*h*4, back E*c*1, front E*e*2, wire *b*.

This battery on the two line-wires *a* and *b* in parallel is sent to the terminating adapter JN1 of FIG. 1 and causes in said adapter all the operations required for selection.

Relay E*f* cannot energize over the above-described circuits, owing to a high resistance in the originating adapter JN1 of FIG. 1.

Ringing current is sent to the called subscriber as indicated in the preceding case.

When the called subscriber answers, relays E*o*, E*l*, E*d*, E*m* operate in accordance with a method already described. At E*d*5 relay E*d* stops the application of battery to calling-end line wires *a* and *b*, in order to cause in the terminating adapter JN1 of FIG. 1 all the operations connected with the called subscriber's answer.

When the called subscriber hangs up, relay E*d* releases, again causing, at E*d*5, the application of battery to line wires *a* and *b*, in order to bring about in adapter JN1 the various operations connected with the hanging up by the called subscriber.

In the case involved, relays E*a* and E*b* have not operated; relay E*e* holds, not over front contact E*b*1 but over wire *t* and a ground applied by adapter JN1, so as to place the release under said adapter's control.

At the end of the call, adapter JN1 removes the ground from wire *t*, thereby causing the release of relay E*e* and hence the release of feeder E.

When the calling party at the exchange ahead is an operator, the latter can, if she so desires, call back a calling subscriber that has just replaced his handset. To that end, she performs a certain operation, which is translated into the sending of a signal received by the adapter JN1 of FIG. 1; the reception of this signal lowers the resistance connected in series with line wires *a* and *b*, thereby causing the energization of relay E*f* in the feeder E involved. At E*f*1 relay E*f* opens the holding circuit of relay E*m*, which releases.

Over its back contacts E*m*1, E*m*2, relay E*m* causes the sending of ringing current to the called subscriber; at E*m*7 it removes the short-circuit from relay E*l*, in order to prepare its energization.

The high resistance in series with line wires *a* and *b* is thereupon restored after a short instant, thus causing the release of relay E*f*. At E*f*1 relay E*f* prepares a re-energizing circuit for relay E*l*.

The various relays of feeder E are then again in the normal position in which they must be during the sending of ringing current and things are back to a case already described.

The case will now be discussed where a metallic connection must be established through feeder E by means of line wires *a* and *b*. As has been indicated, such is the case where line selector L′ (FIG. 1) is directed to an adapter JN4 associated with an originating circuit SD to a satellite; said adapter then suffices alone and feeder AL1 must be eliminated.

After having sent the selective combination or combinations required for directing line selector L′, the register momentarily sends a signal consisting in the application of positive battery to wire *b* and the application of a negative polarity to wire *a*. The following circuit is then completed: positive battery on wire *b*, front E*e*2, back E*i*1, E*g*4, rectifier EQ1, relay E*c*, ground. Relay E*c* energizes. At E*c*2 it completes the following circuit: negative battery on wire *a*, front E*e*3, back E*h*2, E*g*3, front E*c*2, relay E*i*, which energizes, front E*e*7, ground.

Relay E*i* completes a holding circuit for itself over its front contact E*i*2, resistance ER6 and battery; at E*i*3 it switches out the chain of metering relays E*f*, E*g*, E*h*.

When the control polarities applied by the register to calling-end wires *a* and *b* disappear, relay E*c* releases, but relay E*i* holds as stated before. Metallic continuity between incoming and outgoing wires *a* and *b* is established as follows: wire *a*, front E*e*3, back E*g*6, wire *a*, wire *b*, back E*g*7, E*c*1, front E*e*2, wire *b*. The continuity of wire *c* is established over front E*e*4 and back E*c*3, E*m*3; as for wire *t*, it passes directly through register E without being broken by any contact. Owing to the opening of contacts E*i*1 and E*c*2, any shunt is removed from line wires *a* and *b*; feeder E now performs only a passive function, for it is limited to providing the connection between group selector G (not shown) and line selector L′. The holding of the connection is done by the terminating adapter JN1 of FIG. 1, which grounds wire *t*, relay E*e* thus holding.

At the end of the call, adapter JN1 (FIG. 1) removes the ground from wire *t* and relay E releases, opening at E*e*7 the holding circuit of relay E*i*, which releases in turn.

The case will now be discussed of a call to a two-subscriber party line. Upon dialing the number of the first of these two subscribers, the various operations develop as already described with reference to the general operation, but with the following difference: The circuit of the ringing current sent by generator EG over wire *a* has no return over wire *b* but closes through the ringer of the called subscriber's station and a ground applied to said station. When said subscriber answers, his ringer, switched out, and the two wires *a* and *b* are looped metallically, thereby causing, in accordance with a method already described, the energization of relay E*o* by means of the D.C. superimposed on the ringing generator's current. It will be noticed that wire *b* is at a higher potential than wire *a*, so as to operate a secrecy device intended to isolate the other party-line's set.

When the second subscriber's number is dialed, the register momentarily applies negative battery to wire *c* at the same time that it applies to wire *a* the positive battery that must bring about the positioning of the calling-end supply bridge. The positive battery on wire *a* causes, in accordance with a method already described, the energization of relay E*c*, the release of relays E*f* and E*c* and the energization in succession of relays E*h*, E*a* and E*b*. The negative battery on wire *c* causes the energization of relay E*k* over front contacts E*e*4, E*c*3, E*g*5, E*e*7. Relay E*k*, characterizing a call intended for the second party-line subscriber, energizes. At E*k*4 it completes the following holding circuit for itself: battery, resistance ER6, front E*k*4, relay E*k*, front E*e*7, ground. Over its contacts E*k*1, E*k*2, E*k*3 it modifies the circuit sending the ringing current to the called subscriber, as follows: ground, ringing-current generator EG, resistance ER1, back E*n*4, front E*k*2, back E*l*6, E*m*2, front E*h*6, wire *b*, ringer of the called subscriber's station (not shown) and ground applied at that station. When the subscriber answers, his ringer is switched out and the two line-wires *a* and *b* are looped metallically, the ringing-current generator's current then flowing over the following circuit: ground, ringing-current generator EG, circuit already described up to wire *b*, wire *a*, front E*h*5, back E*m*1, E*l*5, front E*k*1, back E*n*5, relay E*o*, front E*k*3, resistance ER7, battery. Relay E*o* is energized by the D.C. superimposed on the ringing-current generator's current and causes the operations described. As in the preceding case, line wire *b* is at a higher potential than wire *a*, for the purpose of causing the operation of the secrecy device intended to isolate the party-line's other set. The other operations are identical with those described for the general case.

The circuit components of the inside termination of a multiple-charge originating adapter will now be described, with reference to FIG. 14. This termination can be used in section *n*/*s* of the originating adapter JN2 of FIG. 1.

When this adapter, referenced F, is free, all its relays are in normal; wire *m* is grounded over back contact F*e*6; wire *t* is connected to battery through resistance FR1 and back contacts F*e*5 and F*o*1.

Adapter F is seized by applying ground to wire *t* and battery to wire *b*, thus causing the energization of relay F*e*. At F*e*1 relay F*e* completes a holding circuit for itself; over its front contact F*e*2 it prepares the speaking circuit; at F*e*3 is applies ground to general holding wire F*tg*, which will be used in the course of the operation; at F*e*4 it applies a ground to wire FF7 reaching equipment I. This equipment I is only the outside termination of the adapter, a termination that is adapted to the type of the circuit. The ground applied to wire FF7 prepares the sending of a seizure signal by equipment I. At F*e*5, F*e*6 relay F*e* removes the availability polarities from wires *t* and *m*.

When the seizure signal must be sent by equipment I to the distant exchange, the register applies a certain polarity to wire *c*, which is sent to said equipment I over back contacts F*g*5, F*f*1, dotted-line circuit and wire FF6, thereby causing the sending of the desired signal.

When the distant exchange is ready to receive the selective combinations required to route the call, equipment I loops wires FF3 and FF4; the calling-end line wires *a* and *b* are then looped as follows through relay F*i*: wire *a*, back F*h*2, F*g*3, relay F*i*, wire FF5, wire FF4, back F*g*4, F*h*3, front F*e*2, wire *b*. Relay F*i* cannot energize in the preceding circuit, owing to a high resistance connected in series in the register.

The register then sends adapter F the various selective combinations required to route the call. The sending of each pulse is effected by supplying the called-end line wires *a* and *b*, thus causing the energization of relay F*i* over the above-described circuit. The sending of these pulses to equipment I is done by means of front contact F*i*1.

At the end of the dialing, the register momentarily applies positive battery to wire *b*, thereby causing the energization of relay F*c*: positive battery on wire *b*, front F*e*2, back F*h*3, F*g*4, rectifier FG1, relay F*c*, ground. A ground pulse is then applied over contacts F*e*3, F*c*1 to a metering chain consisting of relays F*f*, F*g*, F*h*, similar in all respects to metering chain A*f*, A*g*, A*h* of adapter A of FIG. 9. Relays F*f* and F*g* energize in succession, in accordance with a method already described.

Battery is applied over wire *c* to the register, through resistance FR4, front contact F*f*1 and back contact F*g*5, in order to signal that connector F must receive from the register the signal of the tariff applied and thereupon send the corresponding charge pulses to the calling subscriber's meter.

Relay F*g* brings about the connection of adapter F to trunk bundle FC as follows. As has already been explained in the description of the basic schematic of FIG. 9, the exchange involved comprises multipling circuits or trunk bundles such as FC in order to allow the register to send equipment F a certain number of selective signals and to do so without using line wires *a* and *b*. By using the "two-out-of-five" code, five wires can be used per signal; by providing *n* five-wire groups in the connecting bundle, *n* signals can be sent simultaneously and almost instantly, something that would not have been possible by using line wires *a* and *b*. Adapter F can have access to trunk bundle FC through an auxiliary trunk circuit H. The multipling arrows on dot-dash line FCT indicate that trunk bundle FC is common to a plurality of auxiliary trunk circuits H; those on dot-dash line HT indicate that an auxiliary trunk circuit H is itself common to a plurality of adapters F.

When the auxiliary trunk circuit H serving adapter F is free, its two relay H*cg* and H*ch* are in normal. Incoming line wire *a* of adapter F is then connected to battery over the following circuit: wire *a*, back F*h*2, front E*g*3, back F*k*1, H*ch*2, H*cg*1, resistance HR1, battery. The register then grounds wire *c*, thereby causing the energization of relay F*l*: wire *c*, front F*g*5, back F*k*2, F*l*2, relay F*l*, battery.

Relay F*l* holds over front F*l*1, back F*k*5 and front F*e*3. Over its front F*l*2 it transfers wire *c* to auxiliary trunk circuit H, thereby causing the energization of relay H*cg* over back H*ch*1. Over its front F*l*3 . . . F*l*7 it prepares the operation of relays F*ta* . . . F*te*, designed to record the charge signals. For the sake of simplicity, only one of these relays is shown. The figure 5 in parentheses indicates that there are 5 of them. There are 5 wires HD in adapter F, each terminating at one of the contacts F*l*3 . . . F*l*7 and thence at one of the relays F*ta* . . . F*te*. Over its front contact F*l*8 relay F*l* applies battery to wire *b* over the following circuit: resistance FR3, front F*l*3, back F*k*4, front F*g*4, back F*h*3, contact F*e*2, wire *b*. This battery prepares the sending of the charge signals by the register.

In auxiliary trunk circuit H relay H*cg* removes the availability battery at H*cg*1; at H*cg*2 it completes the following circuit: positive battery, relay H*ch* which energizes, front H*cg*2, back F*k*1, front F*g*3, back F*h*2, wire *a* and ground in the register.

Over its back contact H*ch*1 relay H*ch* opens the circuit of relay H*cg*, which releases. Over its front contact H*ch*1 it returns wire *c* to the trunk bundle, for purposes that will be described later. Over its back contact H*ch*2 it prevents the re-application of availability polarity to wire *a* after the re-closing of back contact H*cg*1. Over its front contact H*ch*2 it completes a holding circuit for itself. At H*ch*5 it applies battery to wire HL, in order to energize a test relay (not shown) in trunk bundle FC, if the latter is free.

When the trunk-bundle's test relay has operated, the battery applied to wire HM over front contact H*ch*3 energizes in the trunk bundle a seizure relay (not shown) that brings about the connection of the trunk bundle to auxiliary trunk circuit H. There are no multipling arrows on wire HM, because the seizure relay just mentioned is individual to an auxiliary trunk circuit H. Also, there are no multipling arrows on wire HF, for the reason that trunk bundle FC comprises one wire HF per auxiliary trunk circuit H. The same remark applies to wire HD.

In the example shown it has been assumed that the auxiliary trunk circuit H serving adapter F had access to two different trunk bundles, only one of which (FC) is shown. Where the first trunk bundle is busy, the second trunk bundle is tested and then seized by means of batteries applied to wires HL' and HM' in accordance with the method already described for the first trunk bundle. Finally, where both trunk bundles are free, arrangements are provided to give priority to one of them.

It will be assumed that the trunk bundle seized is trunk bundle FC. A signal characterizing the identity of that trunk bundle is then sent over wire HF and reaches the register over the following circuit: wire HF, front Hch1, Fl2, back Fk2, front Fg5, wire c. Where there are only two trunk bundles in the whole exchange, a positive battery could be provided to characterize the first bundle and a negative battery to characterize the second. Where the total number of trunk bundles exceeds 2, each could, for example, be characterized by a predetermined combination of a plurality of currents of different frequencies.

Upon receiving the signal characterizing the seized trunk bundle FC, the register is connected to it by any suitable means. The register thereupon sends adapter F, through said bundle, a signal characterizing the tariff applicable to the call. In the example shown, it has been assumed that ten different signals could be sent by using the "two-out-of-five" code. Five wires such as HD have been provided for this sending, two wires out of them and two alone being grounded to characterize a specific tariff. Two of the five relays Fta . . . Fte energize over a circuit such as the following: wire Hd, one of front contacts Fl3 . . . Fl7, one of relays Fta . . . Fte, battery. It will be assumed, to make the explanations that follow easier, that the two relays energized are Fta and Ftb.

Relay Fta completes the following holding circuit for itself: battery, relay Fta, front contacts Fta3, Fe3, ground. Relay Ftb completes a similar holding circuit for itself.

Five wires TXF, respectively connected to front contacts Fta4 . . . Fte4, are provided to send the charge signals to meter TX. In the example described, only the first two wires TXF, that is, those respectively connected to front contacts Fta4 and Ftb4, are grounded.

Relay Fk is designed to control the proper reception of the charge signals by relays Fta . . . Fte. It can energize only if two of the relays Fta . . . Fte and two alone are energized. In the example described, relays Fta and Ftb are energized, the circuit of relay Fk being then as follows: battery, relay Fk, back Fte1, Ftd2, Ftc5, front Ftb2, Fta1, Fe3, ground. Over its back contact Fk1 relay Fk opens the circuit of relay Hch, which releases. Over its front contacts Fk1, Fk3, it prepares the reception by relays Fj and Fc of the next signal coming from the register. Over its front contact Fk2 it transfers wire c to the charge meter, in order to prepare the sending of the charge pulses to the calling subscriber's meter. At Fk4 it removes the battery from wire b, in order to tell the register that the charge signals have been received properly. At Fk5 it opens the holding circuit of relay Fl, which releases.

Relay Fl, through the opening of its front contacts Fl2 and Fl3 . . . Fl7, isolates the adapter F involved from auxiliary trunk circuit H.

Relay Hch upon releasing removes the battery from wire HM at Hch3, thereby causing the release of trunk bundle FC.

It will be assumed to begin with, throughout what follows, that it is necessary to switch in a calling-end supply bridge. To that end, the register applies a positive-battery pulse to wire a and the following circuit is completed: wire a, back Fh2, front Fg3, Fk1, Fk3, rectifier FQ1, relay Fc, battery. Relay Fc energizes momentarily. The ground pulse applied over front contacts Fe3, Fc1 to metering chain Ff, Fg, Fh causes, in accordance with a method already described, the release of relay Ff and the energization of relay Fh.

Relay Fh provides for the supplying of the calling subscriber over the following circuit: battery, upper winding of relay Fa, which energizes, back Fd1, Fj2, front Fh2, wires a and b, front Fe2, Fh3, back Fj3, Fd2, lower winding of relay Fa, ground.

Relay Fa causes, over its front contact Fa1, the energization of relay Fb.

Relay Fb holds, over its front contact Fb2. At Fb1 it applies a ground to wire t replacing the ground previously applied by the devices located ahead. The holding of the various devices seized is therefore now under the control of connector F.

When the called subscriber answers, contacts Fd1, Fd2 shift to operating position, in order to reverse the supply polarities on calling-end line wires a and b and thus provide answer supervision.

The connection between the calling and the called subscriber is established over the following circuit: ahead-end wire a, behind-end wires a and b, front contact Fe2 and behind-end wire b.

The charge pulses, whose number depends on the tariff signal recorded, are sent to the calling subscriber's meter over the following circuit: battery, resistance TXR in charge meter TX, front TXa1, Fk2, Fg5, wire c.

At the end of the call, the loop is removed from calling-end line wires a and b and relay Fa releases, short-circuiting, over its back contact Fa1, relay Fb, which releases in turn.

Over its front contact Fb1 relay Fb removes the ground from wire t, thereby causing the release of relay Fe, as also the release of the devices located ahead.

Relay Fe upon releasing removes the general holding ground from wire Ftg, thereby causing the release of relays Fta, Ftb, Fk, Fg, Fh and of equipment I.

It will now be assumed that adapter F must operate in conjunction with a terminating adapter such as adapter JN1 of FIG. 1. To that end, as has been indicated, a signal-exchange system must be provided between said other adapter and the adapter F involved. After having sent the charge signal, the register momentarily applies negative battery to wire a, the following circuit being completed: battery on wire a, back Fh2, front Fg3, Fk1, right-hand winding of relay Fj, relay Fc, battery. Relays Fj and Fc energize momentarily.

As has been indicated, relay Fe causes the release of relay Ff and the energization of relay Fh.

Relay Fj completes a holding circuit for itself over front contacts Fj1, Fe3 and ground. Over its front contacts Fj2, Fj3 it loops calling-end line wires a and b: wire a, front Fh2, Fj2, self-induction coil XS2, front Fj3, Fh3, wire b.

When the selection of the called subscriber has ended, front contact Ia1, located in equipment I, closes, battery being then applied to the midpoint of self-induction coil XS2 over: battery, left-hand winding of relay Ff, back Ib1, front Ia1, midpoint of coil XS2. This battery is thereupon applied in parallel to calling-end wires a and b, in order to tell terminating adapter JN1 of FIG. 1 that the selection has ended. Relay Ff cannot energize in this circuit, owing to a high resistance in series in the terminating adapter.

When the called subscriber answers, back contact Ib1 is opened, thereby removing the battery applied to line wires a and b in parallel and thus telling the terminating adapter that the subscriber has answered.

When the called subscriber hangs up, back contact Ib1 is closed again and battery is re-applied to line wires a and b in parallel, telling the terminating adapter that the subscriber has replaced his handset.

In the case here under consideration, relays Fa and Fb have remained in normal, front contact Fb1 being open. The ground on wire t and hence the holding of the various devices seized are provided by adapter JN1 of FIG. 1.

At the end of the call, this adapter removes the ground from wire t, thus causing the release of relay Fe and hence the release of adapter F.

When the calling party at the exchange ahead is an operator, the latter can call back a called subscriber that has just replaced his handset. To that end, she performs a certain operation, which is translated into the sending of a predetermined signal; this signal, received by adapter JN1 of FIG. 1, removes the resistance connected in series with the left-hand winding of relay Ff of FIG. 14 and this relay energizes. Over its front contact Ff5 relay Ff applies ground to equipment I to send a call-back signal to the exchange located behind.

Of course, the foregoing descriptions have been given only as a nonlimitative example and numerous modifications can be introduced without departing from the scope of the invention.

*Résumé*

Improvements in telephone systems using a selection chain to connect two lines or circuits and wherein with each line or circuit, or with each line or circuit group, both at the calling and at the called end, is associated a signaling bridge or equipment consisting of a combination of two means, the one adapted to the line or circuit and designed to send out and receive the signals required for the routing of a call and the other a standard means that allows exchanging signals and controls within the exchange and recording certain information required for putting through a call and determining the tolls thereon, the design of these standard means making it possible to simplify manufacture and reduce the cost.

What is claimed is:

1. An automatic telephone system comprising a selection chain for interconnecting calling and called lines in response to the transmission of routing signals to said telephone system indicative of the line number information of any called line, a first signaling bridge connected at the calling end of said chain, a second signaling bridge connected at the called end of said chain, both said signaling bridges comprising means for transmitting and receiving said routing signals, both said first and second bridges having a fixed section connected to and compatible with their respective lines, and the said second bridge having a modifiable section adaptable to be compatible with varying calling line signaling characteristics.

2. An automatic telephone system as defined in claim 1 in which the modifiable section in each second signaling bridge comprises means for recording said line number and toll charge data, and means responsive to the recording of the last said information for operating said selection chain to interconnect calling and called lines and to determine the tolls therefor.

3. An automatic telephone system, as defined in claim 1, further comprising means for altering the operation of the said modifiable section when the calling end of the selection chain requires simplified signalling only, thus adapting said modifiable section to the characteristics of the simplified signals, whereby a single bridge may be used for the selection chain.

4. An automatic telephone system, as defined in claim 3, further comprising a register, means in said register for transmitting first and second signals to the second signalling bridge, and means in said second signalling bridge responsive to said first signals for causing said second signalling bridge to operate in conjunction with the signalling bridge at the calling end and responsive to the said second signals for causing said second signalling bridge to adapt itself to simplified signalling.

5. An automatic telephone system, as defined in claim 4, further comprising line wires, connected to the register, and means in the register for transmitting signals over said line wires to cause the required alteration in the modifiable section of the second signalling bridge, said register transmitting said signals in response to signals received at the time of selection both from the calling and called lines.

6. An automatic telephone system, as defined in claim 1, further comprising first and second types of lines, means for allotting the signalling bridges associated with said lines at the called end so that said lines of a first type operate in conjunction with a calling end signalling bridge and permit the exchange of signals within the central office and so that said lines of a second type are connected directly to permit the direction of the selectors to an allotted signalling bridge.

7. An automatic telephone system, as defined in claim 2, the said recording means including means for transmitting signals from the said recording means to the signalling bridges for special and non-recurrent functions in response to supplementary signals received from said bridges.

References Cited in the file of this patent

UNITED STATES PATENTS

| | | |
|---|---|---|
| 2,153,306 | Hensler | Apr. 4, 1939 |
| 2,272,464 | Hensler | Feb. 10, 1942 |
| 2,437,118 | Ostline | Mar. 2, 1948 |
| 2,590,945 | Curtis | Apr. 1, 1952 |
| 2,629,016 | Gooderham | Feb. 17, 1953 |
| 2,748,193 | Confeld | Aug. 29, 1956 |
| 2,769,862 | Confeld | Nov. 6, 1956 |
| 2,824,912 | Scowcroft | Feb. 25, 1958 |